(12) United States Patent
Tamura et al.

(10) Patent No.: US 9,648,275 B2
(45) Date of Patent: May 9, 2017

(54) COMMUNICATION MANAGEMENT SYSTEM

(71) Applicants: Hideki Tamura, Kanagawa (JP); Shuhei Tsubone, Tokyo (JP)

(72) Inventors: Hideki Tamura, Kanagawa (JP); Shuhei Tsubone, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/710,315

(22) Filed: May 12, 2015

(65) Prior Publication Data

US 2015/0334350 A1 Nov. 19, 2015

(30) Foreign Application Priority Data

May 13, 2014 (JP) ................. 2014-099424

(51) Int. Cl.
| | |
|---|---|
| *H04N 7/14* | (2006.01) |
| *H04N 7/15* | (2006.01) |
| *H04L 29/06* | (2006.01) |
| *H04L 29/08* | (2006.01) |
| *H04L 12/18* | (2006.01) |
| *H04M 3/56* | (2006.01) |

(52) U.S. Cl.
CPC ......... *H04N 7/147* (2013.01); *H04L 12/1813* (2013.01); *H04L 12/1827* (2013.01); *H04L 65/1089* (2013.01); *H04L 67/18* (2013.01); *H04M 3/567* (2013.01); *H04N 7/155* (2013.01)

(58) Field of Classification Search
USPC .......................................... 348/14.01–14.09
See application file for complete search history.

(56) References Cited

U.S. PATENT DOCUMENTS

| | | | | |
|---|---|---|---|---|
| 8,749,610 | B1* | 6/2014 | Gossweiler | H04N 7/15 348/14.08 |
| 9,043,399 | B2* | 5/2015 | Umehara | H04M 3/42374 709/204 |
| 2008/0016156 | A1* | 1/2008 | Miceli | G06Q 10/10 709/204 |
| 2011/0205331 | A1* | 8/2011 | Kato | H04N 7/147 348/14.08 |
| 2011/0249079 | A1* | 10/2011 | Santamaria | H04M 7/0057 348/14.02 |
| 2015/0281646 | A1* | 10/2015 | Yoshida | H04N 7/152 348/14.09 |

FOREIGN PATENT DOCUMENTS

WO   WO 2008/149955 A1   12/2008

* cited by examiner

*Primary Examiner* — Maria El-Zoobi
(74) *Attorney, Agent, or Firm* — Oblon, McClelland, Maier & Neustadt, L.L.P.

(57) ABSTRACT

A communication management system includes a first terminal and a second terminal. The first terminal and the second terminal are each configured to transmit and receive content data including at least video and audio data captured at a location of each of the first terminal and the second terminal. The first terminal is designated as a content delivery source and content data captured at the location of the first terminal is transmitted to the second terminal. The second terminal is restricted from transmitting content data captured at the location of the second terminal.

13 Claims, 21 Drawing Sheets

FIG. 6A

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 6B

TERMINAL MANAGEMENT TABLE

| TERMINAL ID | ADDRESS NAME (TERMINAL NAME) | OPERATING STATUS | COMMUNICATION STATUS | PRESENTER INFORMATION | RESTRICTION INFORMATION | IP ADDRESS OF TERMINAL |
|---|---|---|---|---|---|---|
| 01xx | LECTURE START | | | | | |
| 01aa | AA TERMINAL TOKYO OFFICE JAPAN | ONLINE | PRESENTATION BUSY | 1 | OFF | 1.2.1.3 |
| 01ab | AB TERMINAL TOKYO OFFICE JAPAN | ONLINE | PRESENTATION BUSY | | ON | 1.2.1.4 |
| ... | ... | ... | ... | | | ... |
| 01ba | BA TERMINAL OSAKA OFFICE JAPAN | ONLINE | CALLING | | ON | 1.2.2.3 |
| 01bb | BB TERMINAL OSAKA OFFICE JAPAN | ONLINE | NONE | | ON | 1.2.2.4 |
| ... | ... | ... | ... | | | ... |
| 01ca | CA TERMINAL NEW YORK OFFICE USA | OFFLINE | | | | 1.3.1.3 |
| 01cb | CB TERMINAL NEW YORK OFFICE USA | ONLINE | BUSY | | OFF | 1.3.1.4 |
| ... | ... | ... | ... | | | ... |
| 01da | DA TERMINAL WASHINGTON DC OFFICE USA | ONLINE | PRESENTATION BUSY | 1 | OFF | 1.3.2.3 |
| 01db | DB TERMINAL WASHINGTON DC OFFICE USA | ONLINE | NONE | | ON | 1.3.2.4 |
| ... | ... | | | | | ... |

FIG. 6C

ADDRESS LIST MANAGEMENT TABLE

| REQUEST SOURCE TERMINAL ID | DESTINATION TERMINAL ID |
|---|---|
| 01aa | 01xx,01ab,01ca,01cb |
| 01ab | 01xx,01aa,01ca,01cb |
| ... | ... |

FIG. 6D

SESSION MANAGEMENT TABLE

| SESSION ID | RELAY DEVICE ID | PARTICIPANT TERMINAL ID |
|---|---|---|
| se1 | 111a | 01aa,01ab |
| se2 | 111b | 01ba,01ca |
| se3 | 111d | 01bb,01db |
| ... | ... | ... |

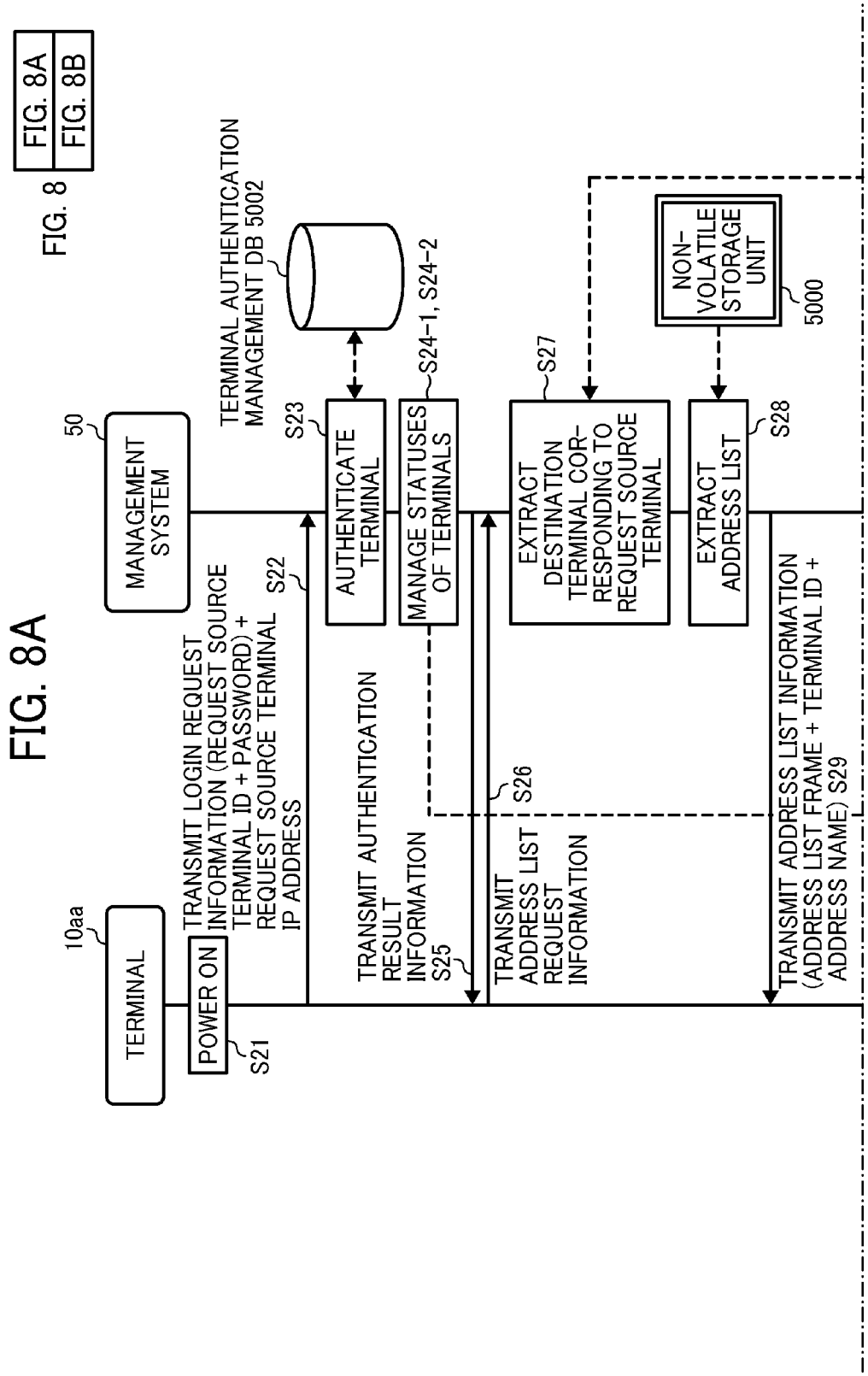

| | ADDRESS LIST | | |
|---|---|---|---|
| STATUS | TERMINAL ID | NAME OF DESTINATION CANDIDATE TERMINAL | |
| 1100-3d ✎ | 01xx | LECTURE START | |
| 1100-3e P | 01aa | AA TERMINAL TOKYO OFFICE JAPAN | |
| 1100-3b ☏ | 01ca | CA TERMINAL NEW YORK OFFICE USA | |
| 1100-3c ☏💬 | 01cb | CB TERMINAL NEW YORK OFFICE USA | |

1100-1, 1100-2

COMMUNICATION MANAGEMENT SYSTEM

CROSS-REFERENCE TO RELATED APPLICATIONS

This patent application is based on and claims priority pursuant to 35 U.S.C. §119(a) to Japanese Patent Application No. 2014-099424, filed on May 13, 2014, in the Japan Patent Office, the entire disclosure of which is hereby incorporated by reference herein.

BACKGROUND

Technical Field

The disclosures herein generally relate to a technique for controlling for communication connection during terminals to transmit content data.

Description of the Related Art

A communication system is a technology to conduct videoconferences, call and so on via communication networks such as the Internet. Owing to recent demand for reducing time and expenses for business trips, such a communication system is becoming increasingly popular. In the communication system, the communication system may be implemented by transmitting and receiving content data such as image data and sound data between two or more communication terminals at different locations. The content data transmitted from the communication terminal is delivered to other communication terminals in real time so that the communication system can be utilized as in the lecture. In this case, when the content data is transmitted interactively via a network between a communication terminal at a presenter and a communication terminal at a participant, the network traffic and noise increases. So in a case of utilizing the communication terminal at the lecture, a technique such as restriction of transmitting the content data from the terminal at the participant is known.

A technique for installing a communication control unit at each terminal at each participant so as to conduct a restriction of transmitting the content is disclosed in Japanese patent publication number 2008-306547. A technique where the terminal at the participant transmits conference content data to a conference server so that the conference server can stream this conference content data to a conference audience connecting to the conference server is disclosed in Japanese patent publication number 2008-22552.

However, there is a problem in the conventional art that a hardware or software configuration has to be changed for the terminal depending on whether or not a terminal is serving as a content data delivery source.

SUMMARY

In an embodiment, a communication connection system includes a connection controller that controls a relay device relaying content data between a terminal serving as a content data delivery source and a counterpart terminal. Circuitry manages information specifying the terminal serving as the content data delivery source. When another terminal different from the content data delivery source connects the relay device, the circuitry controls to transmit the content data transmitted from the terminal specified with the information to another terminal and controls to restrict for transmitting the content data from another terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 6A, 6B, 6C, and 6D are conceptual diagrams illustrating each table managed by the management system;

FIG. 6A is an illustration of a terminal authentication management table;

FIG. 6B is an illustration of a terminal management table;

FIG. 6C is an illustration of a candidate list management table;

FIG. 6D is an illustration of a session management table;

Figure 1:
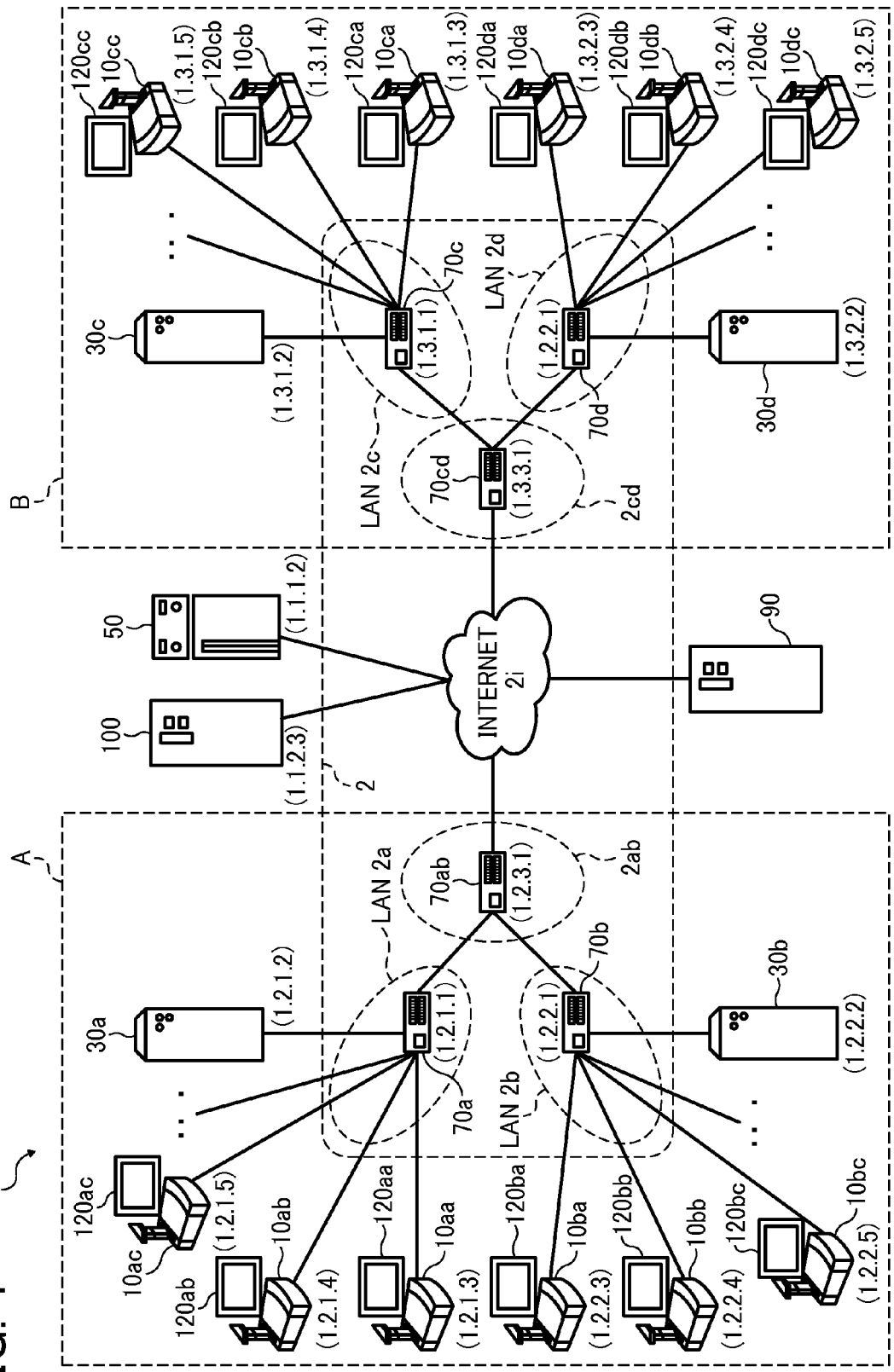
FIG. 1 is a schematic configuration diagram illustrating a communication system according to an embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, a first embodiment of the present invention will be described with reference to the drawings.

In the following, preferred embodiments will be described with reference to the figures. FIG. 1 is a schematic diagram illustrating a communication system 1 according to an embodiment. Initially, an outline of the communication system 1 according to the embodiment is described with reference to FIG. 1.

There are various types of communication systems. One example may be a data providing system. In the data providing system, content data are transmitted from one communication terminal to another communication terminal via a communication management system in one-way direction. Another example may be a communication system. In the communication system, information or emotional expressions are mutually communicated among two or more communication terminals via the communication management system. The communication system is utilized for mutually exchanging information or emotional expressions among the two or more communication terminals (i.e., the communication terminals) via a communication management system (i.e., the communication management system). Examples of the communications system include a videoconference system, a videophone system, an audio conference system, a audio-call system, and a personal computer screen sharing system.

The following embodiments describe the communication system, the communication management system, and the communication terminal by conceptualizing the videoconference system as an example of the communications system, the videoconference management system as an example of the communication management system, and the videoconference terminal as an example of the communication terminal. That is, the communication terminal and the communication management system utilized in this embodiment may be applied not only to the videoconference system, but may also be applied to the communication system.

As illustrated in FIG. 1, the communication system 1 includes two or more communication terminals (10aa, 10ab, . . . ), displays (120aa, 120ab, . . . ) for the communication terminals (10aa, 10ab, . . . ), two or more relay devices (30a, 30b, 30c, 30d, and 30e), a communication management system 50, a program providing system 90, and a maintenance system 100.

Note that in this embodiment, any one of the communication terminals (10aa, 10ab, . . . ) may be referred to as a "communication terminal 10", any one of the displays (120aa, 120ab, . . . ) for the communication terminals (10aa, 10ab, . . . ) may be referred to as a "display 120", and any one of the relay devices (30a, 30b, 30c, 30d, and 30e) may be referred to as a "relay device 30".

The communication terminal 10 is configured to transmit and receive image data and audio data as examples of content data. Note that in the following, the "communication terminal" and the "communication management system" may be simply called as the "terminal" and the "management system", respectively. The communications in this embodiment not only include transmission and reception of audio data but also include transmission and reception of image data. That is, the transmission terminal 10 transmits and receives image data and audio data. However, the transmission terminal 10 may transmit and receive the audio data alone without transmitting or receiving the image data.

In this embodiment, dynamic image data (i.e., video data) are illustrated as an example of the image data; however, the image data may also be static image data. Or, the image data may include both the dynamic and the static image data. The relay device 30 is configured to relay the image data and the audio data among the terminals 10. The management system 50 is configured to manage the terminal 10 and the relay device 30 in an integrated fashion.

Routers (70a, 70b, 70c, 70d, 70d, 70ab, and 70cd) depicted in FIG. 1 are configured to select optimal paths for the image data and the audio data. Note that in this embodiment, any one of the routers (70a, 70b, 70c, 70d, 70d, 70ab, and 70cd) may be simply called a "router 70".

The program providing system 90 includes a not-illustrated hard disk (HD) configured to store programs for a terminal, with which the terminal 10 may implement various functions or various methods. Accordingly, the program providing system 90 may transmit such programs for the terminal to the terminal 10. The HD of the program providing system 90 further stores programs for a relay device, with which the relay device 30 may implement various functions or various methods. Accordingly, the program providing system 90 may also transmit such programs for the relay device to the relay device 30. In addition, the HD of the program providing system 90 further stores communication management programs, with which the management system 50 may implement various functions or various methods. Accordingly, the program providing system 90 may also transmit such communication management programs to the management system 50.

The maintenance system 100 is a computer configured to maintain or manage at least one of the terminal 10, the relay device 30, the management system 50, and the program providing system 90. For example, if the maintenance system 100 is domestically located while the terminal 10, the relay device 30, the management system 50 or the program providing system 90 is located abroad, the maintenance system 100 remotely maintains or manages at least one of the terminal 10, the relay device 30, the management system 50, and the program providing system 90 via a communication network 2. Further, the maintenance system 100 performs maintenance, such as the management of a model number, a manufacturer's serial number, a sales destination, a maintenance inspection, and a failure history, on at least one of the terminal 10, the relay device 30, the management system 50, and the program providing system 90 without utilizing the communication network 2.

The terminals (10aa, 10ab, 10ac, 10a . . . ), the relay device 30a and the router 70a are connected via a LAN 2a so that they may communicate with one another. Further, the terminals (10ba, 10bb, 10bc, 10b . . . ), the relay device 30b and the router 70b are connected via a LAN 2b so that they may communicate with one another. As illustrated in FIG. 1, the LAN 2a and LAN 2b are set up in a predetermined region A. In the region A, the LAN 2a and LAN 2b are connected via a dedicated line tab including the router 70ab so that they may communicate with one another. For example, the region A may be Japan, and the LAN 2a may be set up in the Tokyo Office, whereas the LAN 2b may be set up in the Osaka Office. Meanwhile, the terminals (10ca, 10cb, 10cc, 10c . . . ), the relay device 30c and the router 70c are connected via a LAN 2c so that they may communicate with one another. The terminals (10da, 10db, 10dc, 10d . . . ), the relay device 30d and the router 70d are connected via a LAN 2d so that they may communicate with one another. Further, the LAN 2c and LAN 2d are set up in a predetermined region B. In the region B, the LAN 2c and LAN 2d are connected via a dedicated line 2cd including the router 70cd so that they may communicate with one another. For example, the region B may be USA, and the LAN 2c may be set up in the New York Office, whereas the LAN 2d may be set up in the Washington, D.C. Office. The region A and the region B are connected from the respective routers 70ab and 70cd via the Internet 2i so that the region A and the region B are mutually in communication via the Internet 2i.

Further, the management system 50 and the program providing system 90 are connected to the terminal 10 and the relay device 30 via the Internet 2i so that they may communicate with one another. The management system 50 and the program providing system 90 may be located in the region A or the region B, or may be a region other than the regions A and B.

The relay device 30e is connected to the terminal 10 via the communication network 2. The relay device 30e is configured to be operating constantly, and may be located in a region other than the regions A and B for not being affected by the communications in the local areas of the regions A and B. Thus, when the terminal 10 desires to communicate with another terminal located in the other local area, the relay device 30e is utilized for relaying the communication data between the two terminal at different local areas. Further, the relay device 30e may also be utilized as an emergency relay device when the terminals located within the same local area desire to communicate with one another but the relay devices located in this local area are not operating.

Note that in this embodiment, the communication network 2 is made up of the LAN 2a, the LAN 2b, the dedicated line 2ab, the Internet 2i, the dedicated line 2cd, the LAN 2c and the LAN 2d. In the communication network 2, the communications are typically carried out via the wires, but may partially carried out wirelessly.

In FIG. 1, the set of four numerals attached beneath each of the terminal 10, the relay device 30, the management system 50, the router 70, the program providing system 90, and the maintenance system 100 simply indicates the IP address of the typical IPv4. For example, the IP address for the terminal 10aa is "1.2.1.3", as illustrated in FIG. 1. The IP addresses may be the IPv6; however, in this embodiment, the Ipv4 is used for simplifying the illustration.

[Hardware Configuration of Embodiment]

Figure 2:
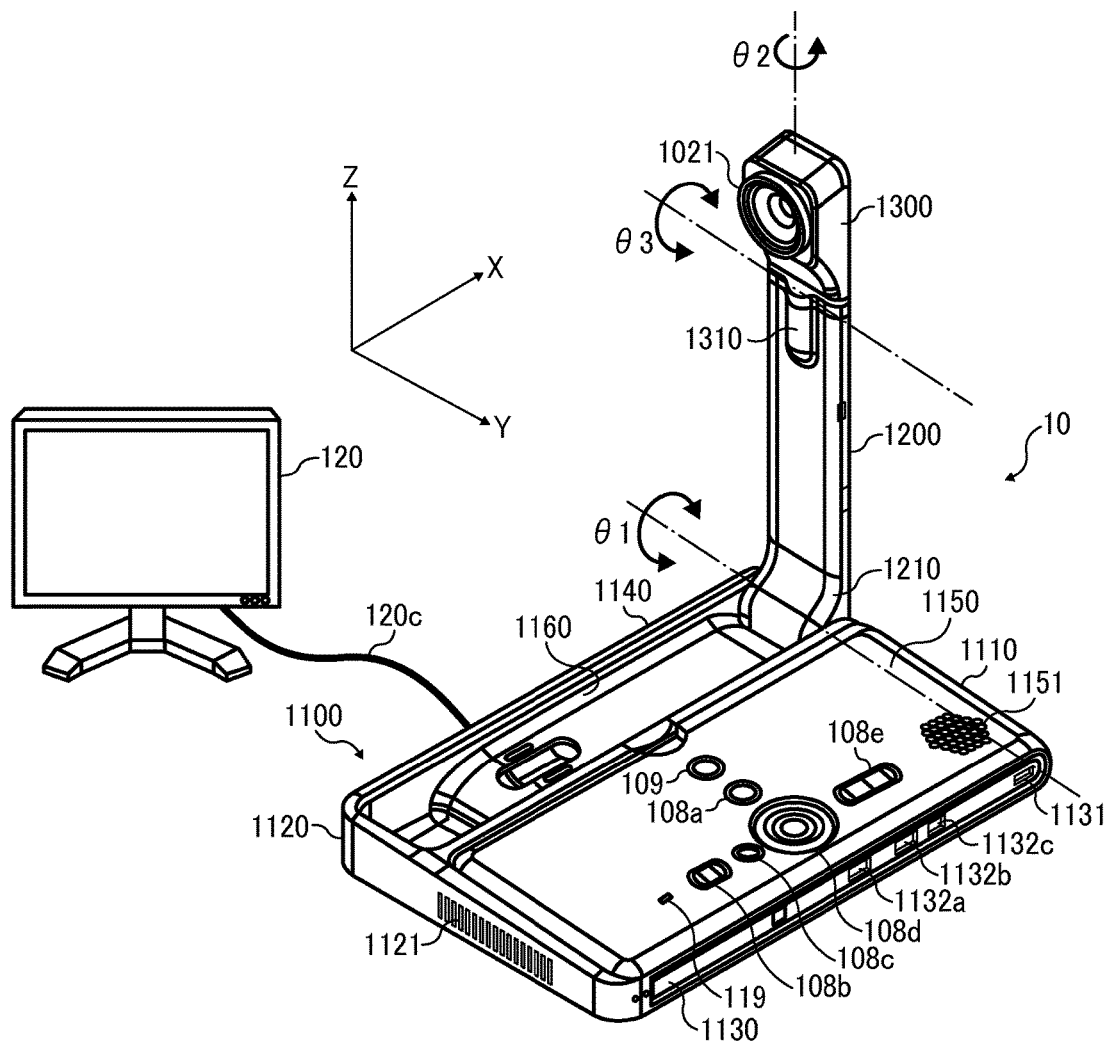
FIG. 2 is an external view of a communication terminal according to the embodiment.

Next, the hardware configuration of the transmission system 1 according to the embodiment is described. FIG. 2 is an external diagram illustrating the terminal 10 according to the embodiment. Hereinafter, an X-axis direction represents a longitudinal direction of the terminal 10, a Y-axis direction represents a direction perpendicular to the X-axis direction in a horizontal plane, a Z-axis direction represents a direction perpendicular to the X-axis direction and the Y-axis direction (i.e., vertical direction).

As illustrated in FIG. 2, the terminal 10 includes a case 1120, an arm 1200 and a camera housing 1300. A front-wall face 1120a of the case 1120 includes a not-illustrated air-intake face formed of air-intake holes and a rear-wall face 1120b of the case 1120 includes an exhaust face 1121 formed of exhaust holes. Accordingly, the terminal 10 may take in external air behind the terminal 10 via the air-intake face and exhaust the air inside the terminal 10 via the exhaust face 1121 by driving a cooling fan arranged inside the case 1120. A right-wall face 1130 of the case 1120 includes a sound collecting hole 1131, via which a build-in microphone 114 (see FIG. 2) is capable of picking up audio sound such as voice, sound, or noise.

The right-wall face 1130 of the case 1120 includes an operations panel 1150. The operations panel 1150 includes operations buttons (108a to 108e), a later-described power switch 109, a later-described alarm lamp 119, and a sound output face 1151 formed of sound output holes for outputting sound from a later-described built-in speaker 115. Further, a left-wall face 1140 of the case 1120 includes a recessed seating unit 1160 for accommodating an arm 1200 and an operations panel 1200. The right-wall face 1130 of the case 1120 further includes connecting ports (1132a to 1132c) for electrically connecting cables to a later-described external device connecting IF 118. The left-wall face 1140 of the case 1120 further includes a not-illustrated connecting port for electrically connecting a display cable 120c cable to the later-described external device connecting IF 118.

Note that hereinafter, any one of the operations buttons (108a to 108e) may be called an "operations button 108" and any one of the connecting ports (1132a to 1132c) may be called a "connecting port 1132".

Next, the arm 1200 is attached to the case 1120 via a torque hinge 1210 such that the arm 1200 moves in upward and downward directions within a tilt-angle θ1 range of 135 degrees with respect to the case 1120. The arm 1200 illustrated in FIG. 2 is arranged at a tilt-angle θ 1 of 90 degrees.

The camera housing 1300 includes a later-described camera 112 configured to take images of a user, documents, a room, and the like. The camera housing 1300 further includes a torque hinge 1310. The camera housing 1300 is attached to the arm 1200 via the torque hinge 1310. The camera housing 1300 is rotationally attached to the arm 1200 in the upward and downward directions via the torque hinge 1310 such that the camera housing 1300 moves in a pan-angle θ2 range of plus or minus 180 degrees and a tilt-angle θ3 range of plus or minus 45 degrees based on the pan and tilt angles illustrated in FIG. 2 are both 0.

Note that external appearances of the relay device 30, the management system 50, the program providing system 90, and the maintenance system 100 are all similar to a typical server computer, and their descriptions are therefore omitted.

Figure 3:
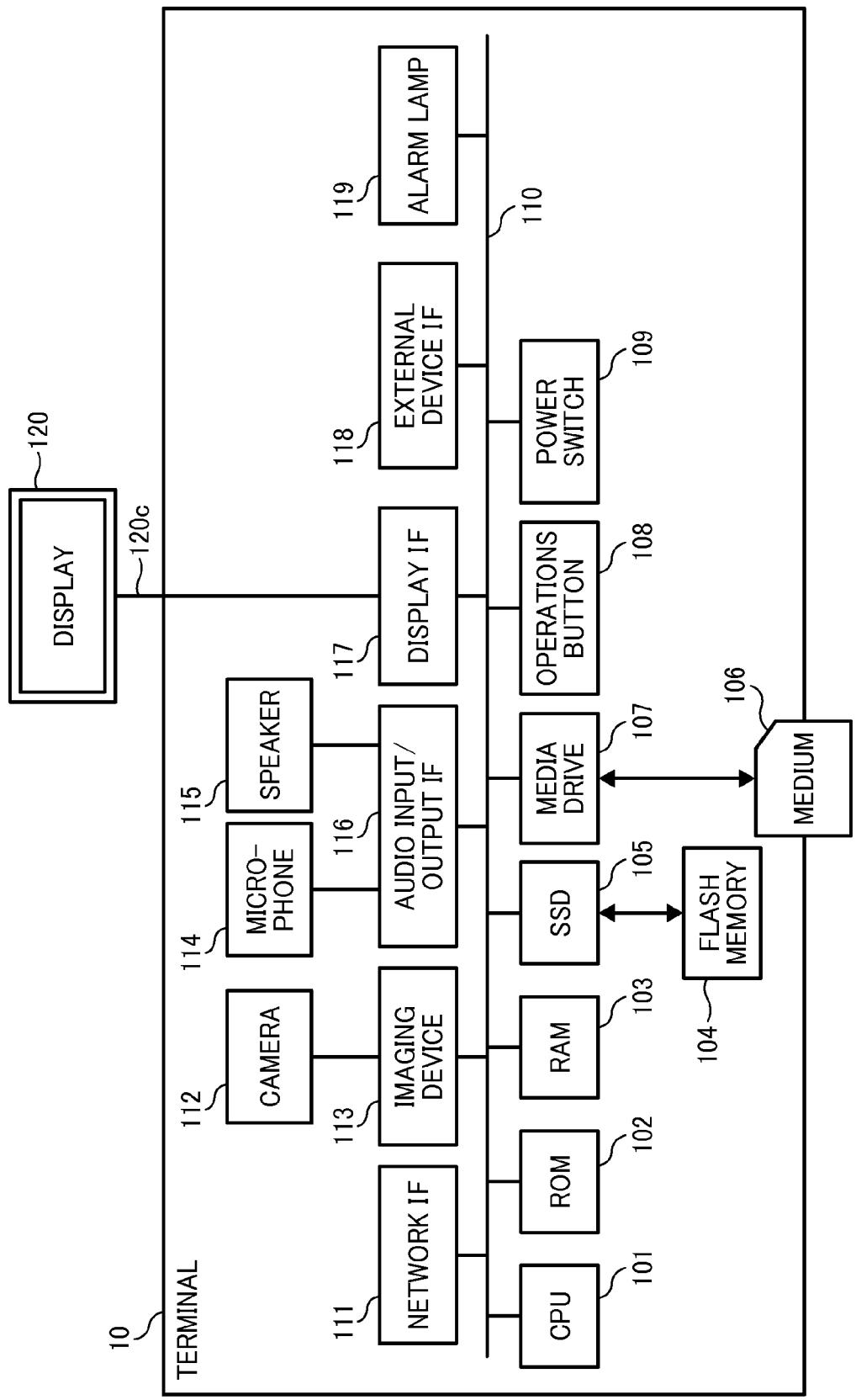
FIG. 3 is a hardware configuration diagram illustrating a transmission terminal in the transmission system according to the embodiment.

FIG. 3 is a hardware configuration diagram illustrating the terminal (i.e., transmission terminal) 10 according to an embodiment. As illustrated in FIG. 3, the terminal 10 includes a central processing unit (CPU) 101 configured to control overall operations of the terminal 10, a read only memory (ROM) 102 storing programs for the terminal, a random access memory (RAM) 103 utilized as a work area of the CPU 101, a flash memory 104 configured to store various data such as image data or sound data, a solid state drive (SDD) 105 configured to control retrieval and writing (storing) of the various data in the flash memory 104 and the like based on the control of the CPU 101, a media drive 107 configured to control retrieval and writing (storing) of data into a recording medium 106 such as a flash memory, the operations button 108 operated by a user for selecting an address of the terminal 10, the power switch 109 for switching ON/OFF of the power of the terminal 10, and a network interface (IF) for transmitting data utilizing the communication network 2.

The terminal 10 further includes the built-in camera 112 configured to image a subject based on the control of the CPU 101, an imaging device IF 113 configured to control driving of the camera 112, the built-in speaker 115 configured to output sound, a sound input/output IF 116 configured to process input and output of sound signal transmitted between the built-in microphone 114 and the built-in speaker 115, a display IF 117 configured to output image data to the external display 120 based on the control of the CPU 101, the external device connecting IF 118 configured to connect various external devices to the connecting ports, the alarm lamp 119 configured to inform the user of various functional problems of the terminal 10, and a bus line 110 such as an address bus or a data bus for electrically connecting the elements and devices with one another illustrated in FIG. 3 via the bus line 110.

The display 120 is a display unit formed of liquid crystal or an organic EL material configured to display images of the subject or icons for operating the terminal 10. Further, the display 120 is connected to the display IF 117 via the cable 120c (see FIG. 37). The cable 120c may be an analog RGB (VGA) cable, a component video cable, a high-definition multimedia interface (HDMI: High-Definition Multiple Interface: Registered Trademark) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connecting IF 118 may be connected via a universal serial bus (USB) with external devices such as the external camera, the external microphone, and the external speaker. On connecting the external camera to the external device connecting IF 118 via the USB, the external camera is driven in priority to the built-in camera 112. Likewise, on connecting the external microphone or external speaker to the external device connecting IF 118 via the USB, the external microphone or external speaker is driven in priority to the built-in microphone 114 or the built-in speaker 115.

Note that the recording medium 106 is removable from the terminal 10. In addition, if the recording medium 106 is a non-volatile memory configured to retrieve or write data based on the control of the CPU 101, the recording medium 106 is not limited to the flash memory 104, and may be an electrically erasable and programmable ROM (EEPROM).

Further, the aforementioned programs for the terminal may be recorded in an installable format or in an executable format on a computer-readable recording medium such as the recording medium 106 to distribute such a recording medium.

Figure 4:
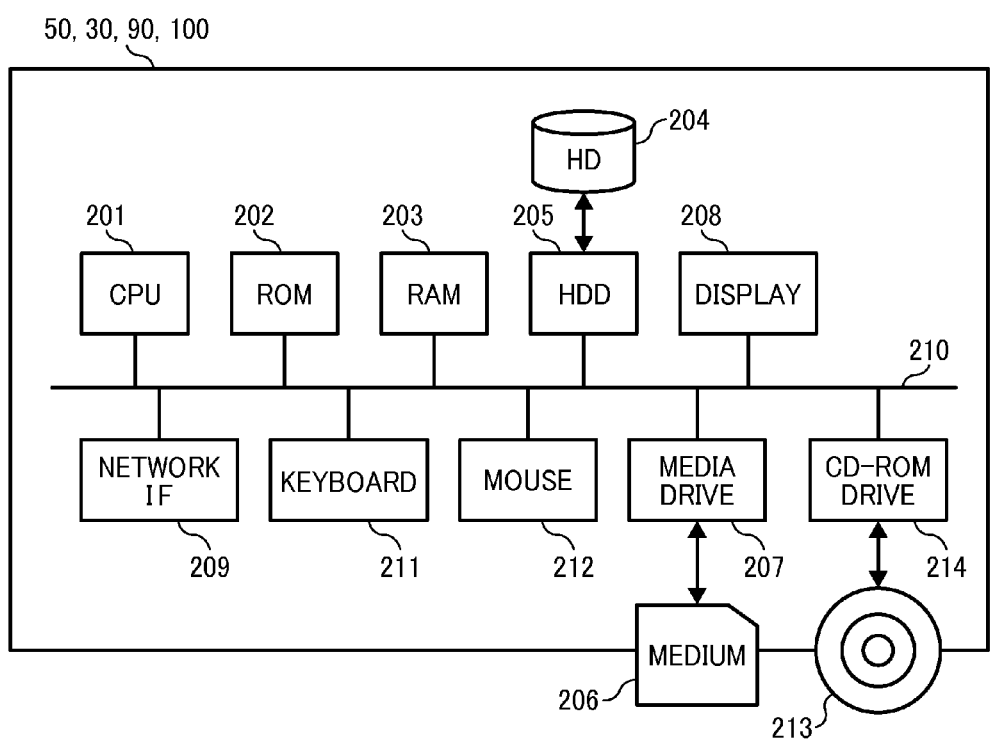
FIG. 4 is a hardware configuration diagram illustrating a transmission management system, a relay device, a program providing system, or a maintenance system in the transmission system according to the embodiment.

FIG. 4 is a hardware configuration diagram illustrating the management system 50 according to an embodiment. The communication management system 50 includes a central processing unit (CPU) 201 configured to control overall operations of the communication management system 50, a read only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a media drive 207 configured to control retrieval and writing (storing) of data into a recording medium 206 such as a flash memory, a display 208 configured to display various information such as a cursor, menus, windows, characters and images, a network IF 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-drive 214 configured to control retrieval or writing of data in the compact disk read-only memory (CD-ROM) 213 as an example of a removable recording medium, and a bus line 210 such as an address bus or a data bus for electrically connecting the elements and devices with one another illustrated in FIG. 4 via the bus line 210.

Note that the aforementioned programs for the communication management may be recorded in an installable format or in an executable format on a computer-readable recording medium such as the recording medium 206 or the CD-ROM 213 to distribute such a recording medium.

Further, the relay device 30, the program providing system 90 and the maintenance system 100 includes a hardware configuration similar to that of the management system 50, and the description of the hardware configuration of the maintenance system 100 is therefore omitted. Note that the ROM 202 stores programs for controlling the relay device 30, the program providing system 90 and the maintenance system 100. In this case, the relay device 30, the program providing system 90 and the programs for the maintenance system 100 may also be recorded in an installable format or in an executable format on a computer-readable recording medium such as the recording medium 206 or the CD-ROM 213 to distribute such a recording medium.

Note that other examples of the removable recording medium include a compact disc recordable (CD-R), a digital versatile disk (DVD), and a Blu-ray Disc (BD).

[Functional Configuration of Embodiment]

Figure 5:
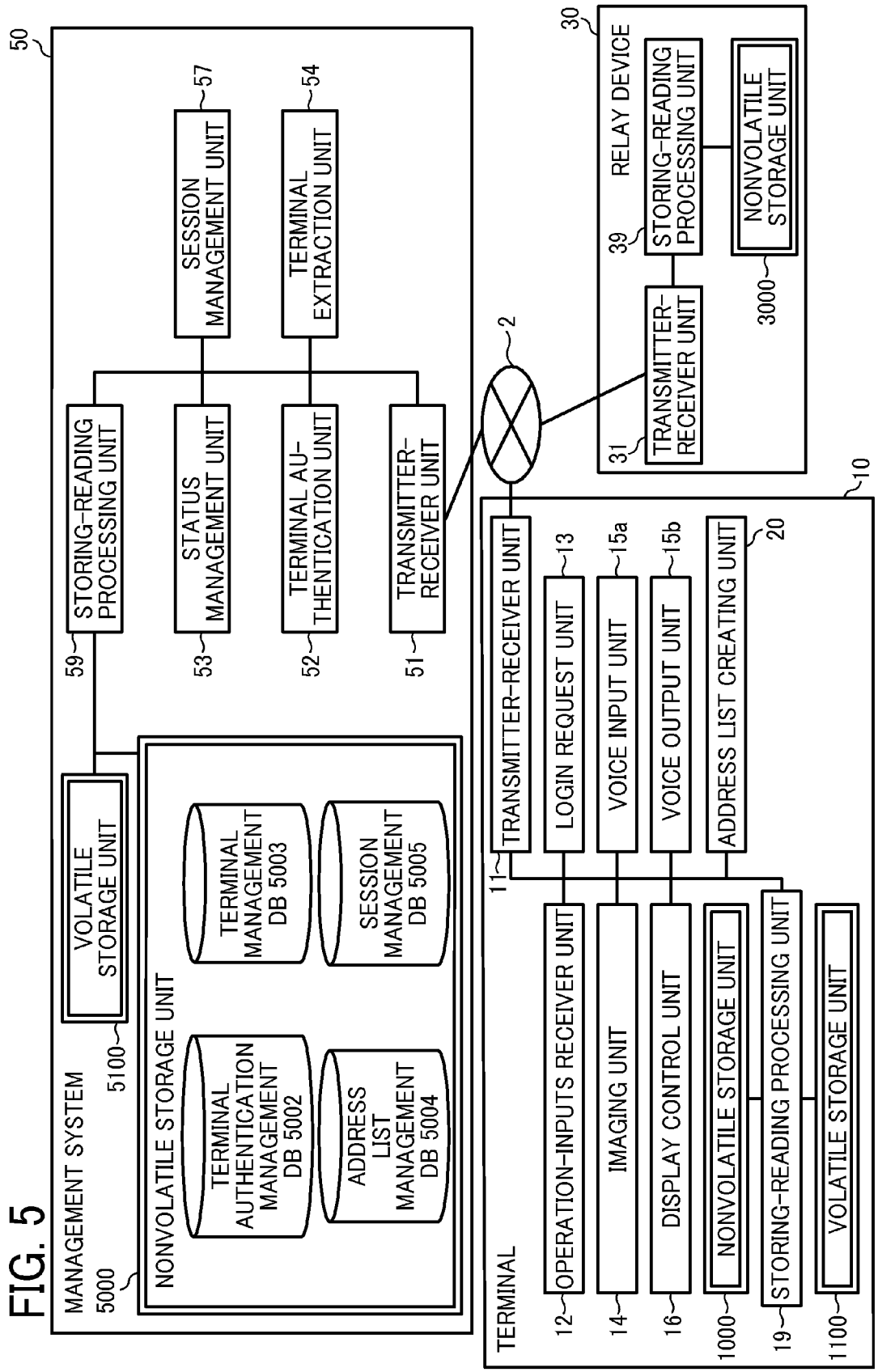
FIG. 5 is a functional block diagram of the management system, the terminal and the relay device.

Next, a functional configuration of the communication system 1 according to the embodiment is described. FIG. 5 is a functional block diagram illustrating the transmission terminal 10, the relay device 30, and the manager system 50 that constitute the transmission system 1 according to the embodiment. As illustrated in FIG. 5, the terminal 10, the relay device 30, and the management system 50 are connected via the communication network 2 such that they carry out data communications with one another via the communication network 2. Note that the program providing system 90 and the maintenance system 100 are not directly associated with videoconferencing communications, and their illustrations are therefore omitted from FIG. 5.

[Functional Configuration of Terminal]

The terminal 10 includes a transmitter-receiver unit 11, an operation-inputs receiver unit 12, a login request unit 13, an imaging unit 14, a sound input unit 15a, a sound output unit 15b, a display control unit 16, a delay detector unit 18, a storing-reading processing unit 19, and an address list creating unit 20. The above units represent functions and units implemented by any of the elements and devices illustrated in FIG. 3, which are activated by instructions from the CPU 201 based on the programs stored in the ROM 102. Further, the terminal 10 further includes a volatile storage unit 1100 formed of the RAM 103 illustrated in FIG. 2, and a nonvolatile storage unit 1000 formed of the flash memory 104 illustrated in FIG. 2.

[Functional Units of Terminal]

Next, the functional units of the terminal 10 are described in more detail. The transmitter-receiver unit 11 of the terminal 10 is configured to transmit various data (information) to and receive such data from other terminals, relay devices, and systems.

The operation-inputs receiver unit 12 is configured to receive various inputs from the user, and such a function of the operation-inputs receiver unit 12 is implemented by the operations button 108 and the power switch 109. For example, when the user switches ON the power switch 109, the operation-inputs receiver unit 12 receives a power-ON signal to switches ON the power of the terminal 10.

The login request unit 13 is configured to automatically transmit login request information indicating that the user desires to login, and a current IP address of the terminal 10 as an IP address of a request source terminal from the transmitter-receiver unit 11 to the management system 50 via the communication network 2 when the power-ON signal is received by the operation-inputs receiver unit 12 as a trigger. Such a function of the login request unit 13 is implemented by instructions received from the CPU 101 illustrated in FIG. 2. On the other hand, when the user switches OFF the power switch 109, the transmitter-receiver unit 11 transmits power off status information to the management system 50, and the operation-inputs receiver unit 12 subsequently turns OFF the power of the terminal 10 completely. Accordingly, the management system 50 may detect a power status of the terminal 10 as an OFF status.

The imaging unit 14 is configured to take an image of a subject and output image data of the subject, and such a function of the imaging unit 14 is implemented by instructions received from the CPU 101, and also by the camera 112 and the imaging device IF 113. The sound input unit 15a is configured to input sound data of the sound signal obtained by the microphone 114 that converts sound of the user into the sound signal, and such a function of the sound input unit 15a is implemented by the sound input/output IF 116.

The display control unit 16 is configured to control transmission of the image data to the external display 120, and such a function of the display control unit 16 may be implemented by the network IF 117 illustrated in FIG. 2.

The storing-reading processing unit 19 is configured to store various data in a nonvolatile storage unit 1000 or retrieve various data from the nonvolatile storage unit 1000, and such a function of the storing-reading processing unit 19 may be implemented by instructions received from the CPU 101 and also by the SSD 105 illustrated as an example in FIG. 2. The nonvolatile storage unit 1000 stores a terminal identification (ID), and a password, and the like for identifying the terminal 10. The storing-reading processing unit 19 is configured to further store various data in the volatile storage unit 1100 and retrieve various data from the volatile storage unit 1100. The storing-reading processing unit 19 overwrites the image data and the sound data in the volatile storage unit 1100 with new ones received from the destination terminal every time the terminal 10 talks to the destination terminals. Note that the display 120 displays previous image data before being overwritten with the new image data and the speaker 115 outputs previous sound data before being overwritten with the new sound data.

Figure 20:
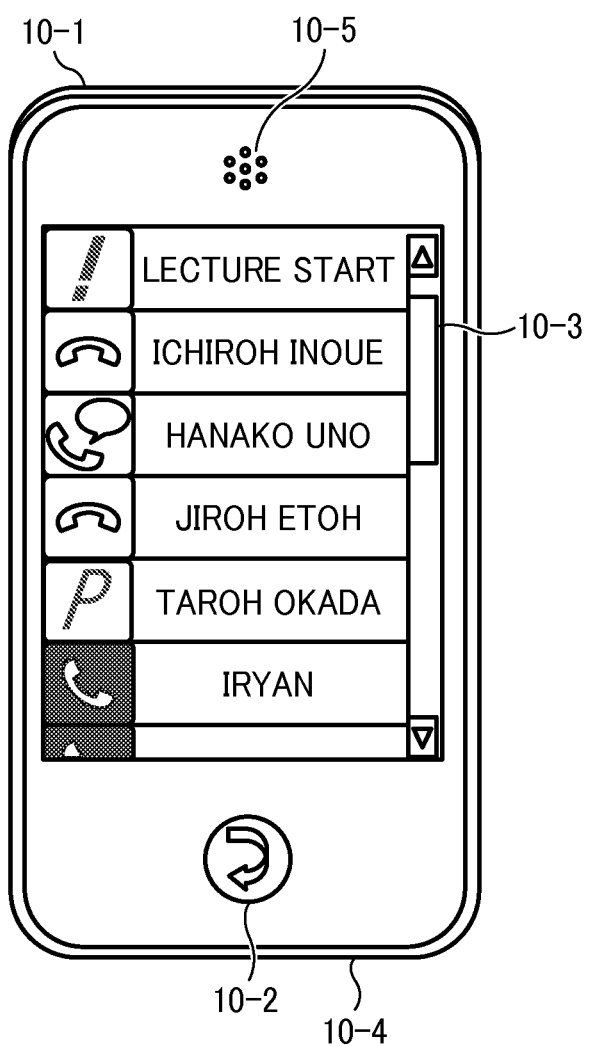
FIG. 20 is an illustrates an example of an address list displayed on the mobile phone terminal.

The address list creating unit 20 is configured to create and update an address list illustrated in FIG. 20 which display statuses of the destination candidates with icons based on the later-described address list information and the status information of the terminal 10 as a destination candidate.

Note that the terminal ID and the later-described relay device ID individually indicate identification information formed of language, characters, and various symbols that uniquely identify the terminal and the relay device. The terminal ID and the relay device ID may be the identification information formed of a combination of two or more of the languages, characters, and various symbols.

(Functional Configuration of Relay Device)

Next, functions and units of the relay device 30 are described. As illustrated as an example in FIG. 4, the relay device 30 includes a transmitter-receiver unit 31, a status detector unit 32, a data quality checker unit 33, a alteration quality management unit 34, a data quality alteration unit 35, and a storing-reading processing unit 39. The above units represent functions and units implemented by any of the elements and devices illustrated in FIG. 4, which are activated by instructions from the CPU 201 based on the programs stored in the ROM 202. Further, the relay device 30 further includes a nonvolatile storage unit 3000 formed of the HD 204 illustrated in FIG. 4, which is capable of maintaining the various data or information even when the power of the relay device 30 is turned off.

[Functional Units of Relay Device]

Next, the functional configuration of the relay device 30 is described. Note that in the following description, the functions of the relay device 30 are illustrated in association with the main elements and devices for implementing the units of the relay device 30 illustrated in FIG. 4.

The transmitter-receiver unit 31 of the relay device 30 is configured to transmit various data (information) to and receive such data from other terminals, relay devices and systems. The function of the transmitter-receiver unit 31 may be implemented by the network IF 209 illustrated in FIG. 3. The storing-reading processing unit 39 which are activated by instructions from the CPU 201 is configured to store various data in the nonvolatile storage unit 3000 and retrieve various data from the nonvolatile storage unit 3000.

[Functional Configuration of Management System]

Next, functions and units of the management system 50 are described. The management system 50 includes a transmitter-receiver unit 51, a terminal authentication unit 52, a terminal management unit 53, a terminal extraction unit 54, a session management unit 57 and a storing-reading processing unit 59.

The above units represent functions and units implemented by any of the elements and devices illustrated in FIG. 4, which are activated by instructions from the CPU 201 based on the programs stored in the ROM 202. Further, the management system 50 further includes a nonvolatile storage unit 5000 formed of the HD 204, which is capable of maintaining the various data or information even when the power of the management system 50 is turned off. For example, the nonvolatile storage unit 5000 stores an address list frame 1100-1 illustrated in FIG. 9. The management system 50 may include a volatile storage unit 5100 formed of the RAM 203.

(Authentication Management Table)

The nonvolatile storage unit 5000 includes a terminal authentication management DB 5002 formed of a terminal authentication management table illustrated in FIG. 6(A). In the terminal authentication management table, passwords are individually associated with the terminal IDs of all the terminals managed by the management system 50.

(Terminal Management Table)

The nonvolatile storage unit 5000 includes a terminal management DB 5003 formed of a terminal management table illustrated in FIG. 6(B). In the terminal management table, terminal IDs of the terminals 10 as destination terminals are associated with terminal names of the destination terminals 10, operating statuses of the destination terminals 10, communication statuses of the destination terminals 10 with other terminals, receipt time and dates at which the later-described login request information of the destination terminals 10 is received by the management system 50, and IP addresses of the destination terminals 10. The communication status "NONE" indicating that the terminal 10*aa* is in a waiting status and not communicating with other terminals, a "BUSY" indicating a status where the terminal is engaged with communicating with another terminal, and a "PRESENTATION BUSY" indicating a status where the terminal transmits the content data during the lecture or the terminal receives the content data during the lecture. In the terminal management table, the communication status "PRESENTATION BUSY" of the terminals 10 serving as a delivery source of content data is associated with presenter information "1" indicating a status where the terminal is a presenter. In the terminal management table, the communication status "PRESENTATION BUSY" of the terminals 10 is associated with restriction information "on" indicating a status where the transmitting content data is restricted or with the restriction information "off" indicating a status where the transmitting content data is not restricted.

Note, the terminal ID "01*xx*" in the terminal management table is a terminal ID of a particular terminal that is selected as a destination candidate in starting delivery of content data during the lecture. As an embodiment of this invention, the particular terminal may be a terminal's own self to which it transmit the content data. For example, when the particular terminal is selected as the destination terminal in the terminal 10*aa* starting communication, the terminal 10*aa* transmits a communication initiation request to the management system 50. The communication initiation request is a request that is sent to the management system 50 when the terminal 10*aa* transmits the content data to the terminal 10*aa* itself.

(Terminal List Management Table)

The nonvolatile storage unit 5000 includes an address list management DB 5004 formed of an address list management table illustrated in FIG. 6(C). In the address list management table, terminal IDs of registered destination candidate terminals are associated with the terminal IDs of the request source terminals that request initiation of a videoconference communication. For example, in the address list management table illustrated in FIG. 6(C), the terminal ID "01*aa*" of the request source terminal 10*aa* is associated with a destination candidate terminal 10*ab* having a terminal ID "01*ab*", a destination candidate terminal 10*ba* having a terminal ID "01*ba*", which the request source terminal requests to initiate the videoconference.

The address list management table manages the terminal ID "01*xx*" of the particular terminal as the candidate terminal, the terminal ID "01*xx*" is associated with a terminal ID of the request source terminal. Accordingly, it is possible the terminal 10 to request for communication start in a state of lecture mode. Note that the address list management table manages the terminal ID "01*xx*" of the particular terminal as the candidate terminal in association with a part of all terminal IDs of the request source terminals. Accordingly, it is possible for limit the terminal 10 of the request source terminal.

(Session Management Table)

The nonvolatile storage unit 5000 includes a session management DB 5005 formed of a session management table illustrated in FIG. 6(D). In the session management table, session IDs that identify sessions in which the communication data are transmitted and received between the terminals are associated with the relay device IDs of the relay devices 30 utilized for relaying the image data and the sound data, the terminal ID of the terminal (participant terminal) participated in this session.

(Functional Units of Management System)

Next, functional units of the management system 50 are described. Note that in the following description, the functions of the management system 50 are illustrated in association with the main elements and devices for implementing the units of the management system 50 illustrated in FIG. 4.

The transmitter-receiver unit 51 of the management system 50 is configured to transmit various data (information) to and receive such data from other terminals, relay devices, and systems. The function of the transmitter-receiver unit 51 may be implemented by the network IF 209. The terminal authentication unit 52 is configured to search the terminal authentication management table (see FIG. 6) of the nonvolatile storage unit 5000 by the terminal ID and a password contained in the login request information as search keys, and authenticate the corresponding terminal based on whether the terminal ID and the password contained in the login request are identical to those managed in the terminal authentication management table.

The terminal management unit 53 which are activated by instructions from the CPU 201 is configured to manage the terminal management table (see FIG. 6(B)) by associating the terminal ID of the request source terminal, the operating status of the request source terminal and the IP address of the request source terminal. The terminal management unit 53 searches the terminal management table with the terminal ID as a search key and reads the operation status and so on of the searched terminal ID.

The terminal extraction unit 54 is configured to search the address list management table (see FIG. 6(C)) by the terminal ID of the request source terminal that has requested for the login as a key, and retrieve the terminal IDs of the destination candidate terminals capable of communicating with the request source terminal. Such a function of the terminal extraction unit 54 is implemented by instructions received from the CPU 101.

The session management unit 57 is configured to generate a session ID to identify the session transmitting the content data during the terminals 10. The session management unit 57 is configured to choose the relay device 30 relaying the content data via the session among a plurality of relay devices. The session management unit 57 configured to store and manage the session IDs in association with the terminal ID of the request source terminal and the terminal ID of the destination terminal in the session management table (see FIG. 6(D)) of the nonvolatile storage unit 5000. Such a function of the session management unit 57 is implemented by instructions received from the CPU 101.

[Process and Operation]

Figure 7:
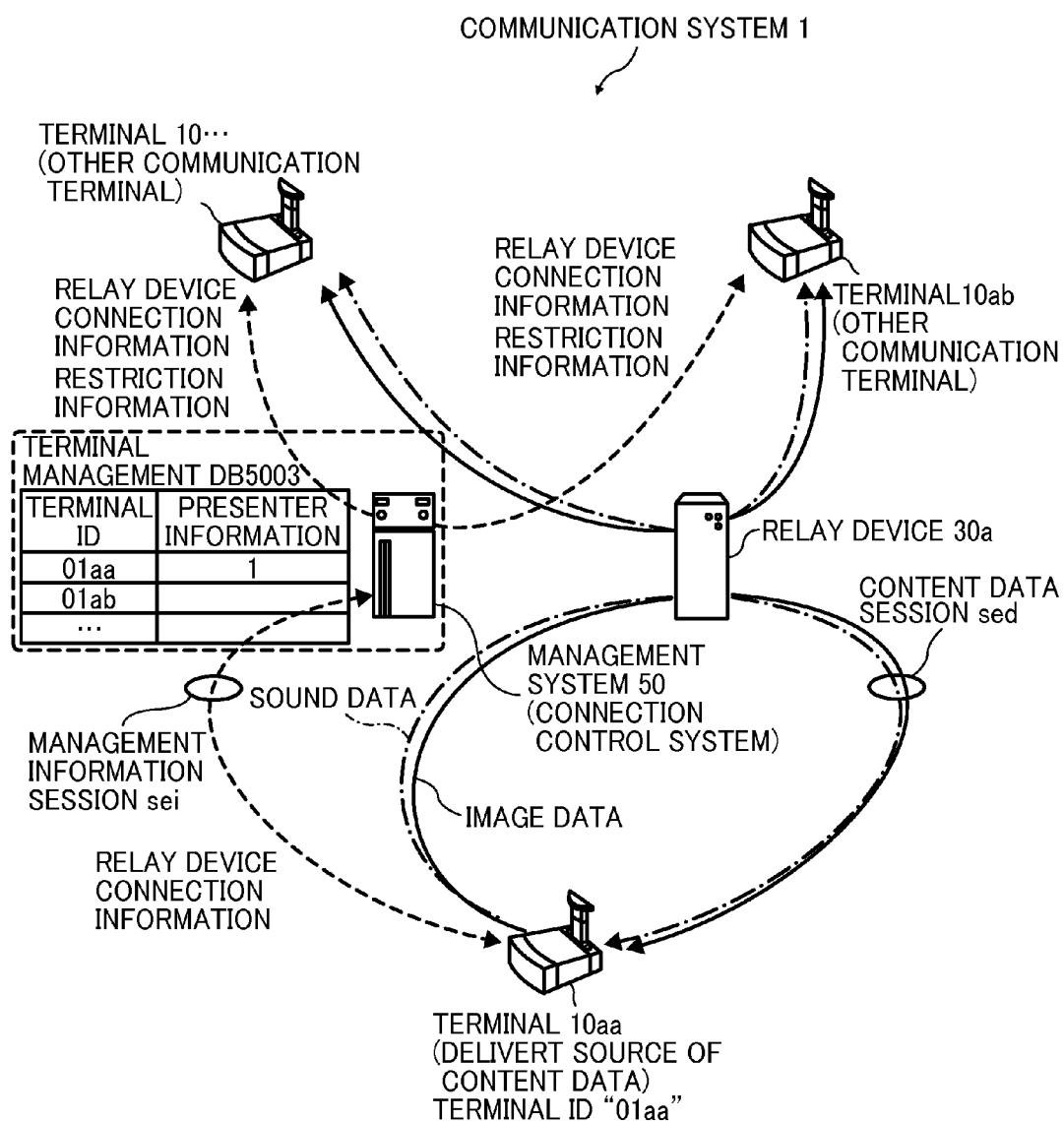
FIG. 7 is a conceptual diagram illustrating transmitting and receiving statuses of image data, sound data and various management information in the communication system.

So far, the configuration and functions (units) of the communication system 1 according to the embodiment are described, and processes and operations carried out by the communication system 1 according to the embodiment are subsequently described. In using FIG. 7, an outline of the processes and operations according to the embodiment is described. Note that FIG. 7 is a conceptual diagram illustrating transmitting and receiving statuses of image data, sound data and various management information in the communication system 1.

In the communication system 1, a management information session sei for transmitting various management information is established between each terminal 10 and the management system 50. In the communication system 1, the relay device 30 relays the content data among the terminals 10. Accordingly, a content data session sed for transmitting the content data (sound data and image data) is established between a terminal 10 serving as a delivery source of the content data and the one or more terminals 10 including the terminal 10 serving as a delivery source of the content data.

The transmitter-receiver unit 51 of the management system 50 transmits a relay device connection information as one of the management information to the terminal 10aa serving as the delivery source of the content data. Accordingly, a connection control between the terminal 10 and the relay device 30a is carried out. The terminal management DB 5003 stores and manages a presenter information to determine the terminal 10 as the delivery source of the content data. When the terminal 10ab, different from the terminal 10aa, connects to the relay device 30a, the transmitter-receiver unit 51 transmits a restriction information to the terminal 10ab so that the microphone 114 and the speaker 115 can be controlled to restrict generating the content data. When the relay device 30a relays the content data between the terminal 10aa and the terminal 10ab, the content data transmitted from the terminal 10aa transmits to the terminal 10aa and, a transmission of the content data from the terminal 10ab to the terminal 10aa is controlled to be restricted to restricting the generation of the content data at the terminal 10ab. Accordingly, the management system 50 can control to transmit the content data from each terminal 10 based on the presenter information without changing a configuration of each terminal 10 based on whether or not the terminal 10 is the delivery source of the content data.

The transmitter-receiver unit 51 of the management system 50 transmits an address list information including terminal IDs of the terminals serving as one or more destination candidate terminals to the terminal 10ab. The transmitter-receiver unit 51 transmits, the presenter information in association with the terminal ID of the terminal 10aa serving as the delivery source of the content data, to the terminal 10ab. Accordingly, the terminal 10ab can determine, based on the presenter information, the terminal 10aa serving as the delivery source of the content data in the address list. The terminal 10ab can receive the content data when the terminal 10ab sends the request for initiating the communication to the determined terminal 10aa serving as the delivery source of the content data.

The transmitter-receiver unit 51 of the management system 50 receives cancellation request information indicating a request for cancelling the restriction of transmitting the content data from the terminal 10ab. When the transmitter-receiver unit 51 receives the cancellation request information, the transmitter-receiver unit 51 receives an approval for the request for the cancellation from the terminal 10aa serving as the delivery source of the content data. Upon acceptance of the approval, the transmitter-receiver unit 51 transmits cancellation information indicating information for cancelling the restriction of transmitting the content data to the terminal 10ab. Accordingly, the terminal 10ab can transmit the content data and the terminal 10ab can transmit questions at the side of the terminal 10ab to the terminal 10aa.

The terminal management DB 5003 stores and manages the terminal IDs associated with the terminal name. The transmitter-receiver unit 51 transmits, a terminal name "AB TERMINAL TOKYO OFFICE JAPAN" associated with the terminal ID (01ab) of the terminal 10ab serving as sender of a request for the cancelling the restriction, to the terminal 10aa. Accordingly, the terminal 10aa can determine the terminal 10 serving as the sender of request for the cancelling the restriction even if there are a plural of the terminals receiving the content data from the terminal 10aa.

When the transmitter-receiver unit 11 of the terminal 10 receives the restriction information, the imaging unit 14 controls to restrict generating the image data, and the sound input unit 15a controls to restrict generating the sound data. Accordingly, it is possible to reduce traffic of the network because the content data from this terminal 10 to the relay device 30 is restricted.

The display control unit 16 of the terminal 10 outputs, the image based on the image data transmitted from the terminal 10aa serving as the delivery source of the content data, to the display 120. While a certain terminal cancels the restriction of the transmitting the content data, the display control unit 16 outputs the image based on the image data from the certain terminal. Accordingly, a user of the terminal 10 can view the content data from the terminal serving as the delivery source of the content data and acknowledge questions transmitted from the certain terminal that cancels the restriction of the transmitting the content data.

Figure 8B:
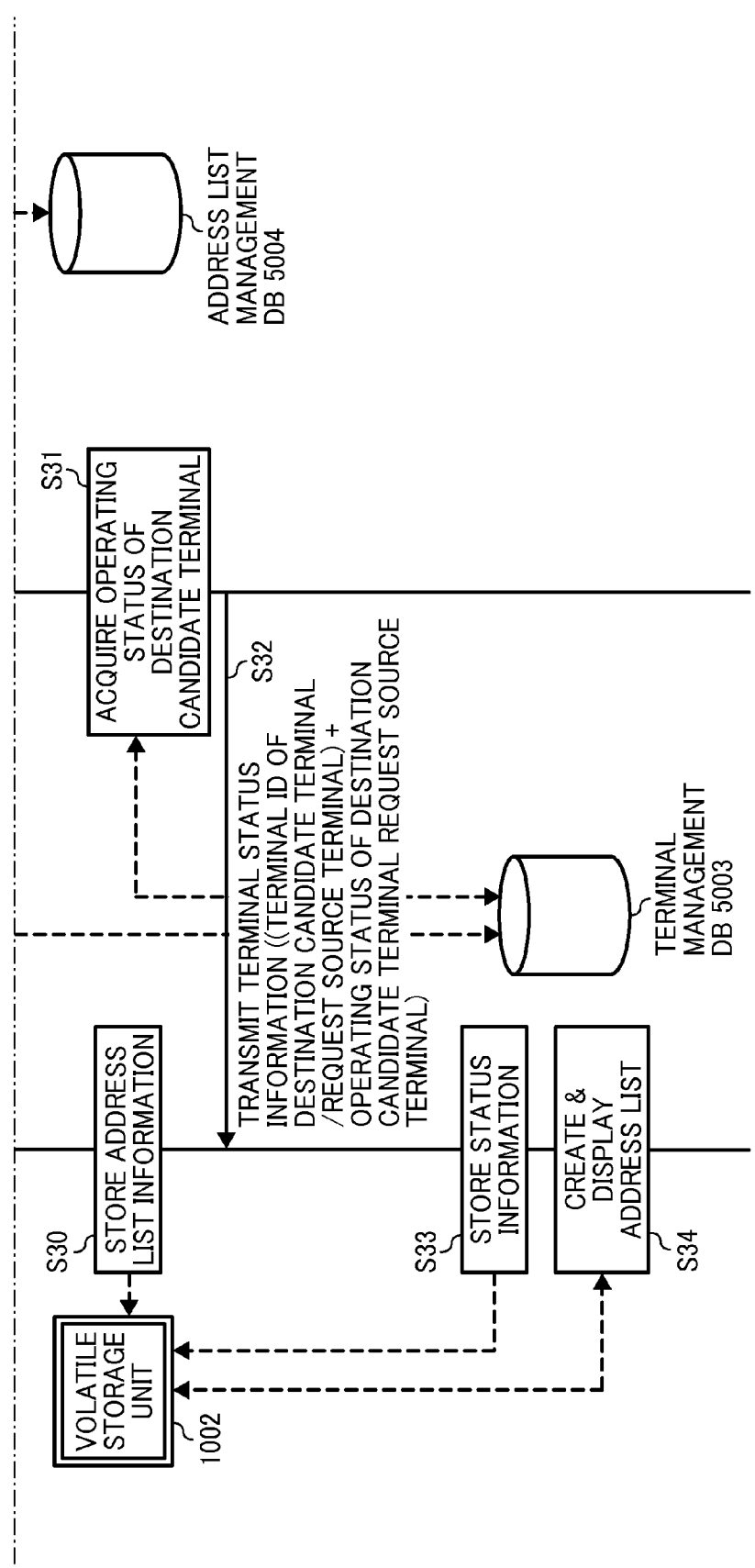
FIG. 8 is a sequence diagram illustrating a process of a preparatory phase when the communication terminals initiate the communication.

Next, process carried out by the communication system 1 according to the embodiment is described in detail. FIG. 8 is a sequence diagram illustrating a process of a preparatory phase when the terminals initiate the communication. A process in which each of the management information items is transmitted and received in a preparatory phase before the terminal 10aa initiates the communication is described with reference to FIG. 8. Note that FIG. 8 illustrates a process in which various management information items are all transmitted and received in the management information sessions sei.

First, when the user of the terminal 10aa switches ON the power switch 109 illustrated in FIG. 2, the operation-inputs receiver unit 12 illustrated in FIG. 4 receives a power-ON signal to switches ON the power of the terminal 10aa (step S21). On receiving the power-ON signal as a trigger, the login request unit 13 automatically transmits the login request information indicating the login request from the transmitter-receiver unit 11 to the management system 50 via the communication network 2 (step S22). The login request information includes a terminal ID and a password for identifying the terminal 10aa indicating an own terminal as the request source terminal. The terminal ID and password are data that are retrieved from the nonvolatile storage unit 1000 via the storing-reading processing unit 19 and then transmitted to the transmitter-receiver unit 11. Note that when the login request information is transmitted from the terminal 10aa to the management system 50, the receiver side management system 50 may detect the IP address of the transmitter side terminal 10aa.

Next, the terminal authentication unit 52 of the management system 50 authenticates the terminal 10aa based on whether the ID and password identical to those in the login request information are managed in the terminal authentication management DB 5002 of the nonvolatile storage unit 5000 by searching for the ID and password as search keys in the terminal authentication management table (see FIG. 6(A)) (step S23).

The terminal authentication unit 52 manages identical terminal IDs and passwords. Accordingly, when the terminal authentication unit 52 determines that the received login request comes from the terminal 10 having a valid access authorization, the terminal management unit 53 stores the receipt time and date of the received login information and the IP address of the terminal 10aa in association with the record presented by the terminal ID and the destination name of the terminal 10aa in the terminal management table (see FIG. 6(B)) (step S24-1). Thus, the terminal IP address "1.2.1.3" are managed in association with the terminal ID "01aa" in the terminal management table illustrated in FIG. 6(B).

Subsequently, the status setting unit 53a of the terminal management unit 53 sets the operating status "ONLINE" and the communication status "NONE" of the terminal 10aa and stores the set operating status and communication status in association with the record presented by the terminal ID and the destination name of the terminal 10aa in the terminal management table (see FIG. 6(B)) (step S24-2).

The transmitter-receiver unit 51 of the management system 50 transmits authentication result information indicating an authentication result acquired by the terminal authentication unit 52 via the communication network 2 to the request source terminal (i.e., terminal 10aa) that has requested the login request (step S25). In the following, the case where the terminal authentication unit 52 has determined that the terminal has the valid access authorization is further described.

When the terminal 10aa receives the determined result indicating that the terminal 10aa has the valid access authorization, the transmitter-receiver unit 11 of the terminal 10aa transmits address list request information indicating an address list request to the management system 50 via the communication network 2 (step S26). The transmitter-receiver unit 51 of the management system 50 then receives the address list request information.

Next, the terminal extraction unit 54 searches the address list management table (see FIG. 6(C)) by the terminal ID (01aa) of the request source terminal (i.e., terminal 10aa) that has requested the address list, and retrieves the terminal IDs of the destination candidate terminals capable of communicating with the request source terminal (i.e., terminal 10aa). As a result, the terminal extraction unit 54 extracts the terminal IDs of the destination candidate terminals capable of communicating with the request source terminal (step S27). In addition, the terminal status acquisition unit 54 searches the terminal management table (see FIG. 6(B)) by the terminal IDs of the destination candidate terminals extracted by the terminal extraction unit 54 as search keys, and retrieves the destination names corresponding to the terminal IDs of the destination candidate terminals. In this example, terminal IDs (01xx, 01ab, 01ca, 01cb) of the destination terminals (10xx, 10ab, 10ca, 10cb) associated with the terminal ID "01aa" of the request source terminal (i.e., terminal 10aa) and terminal names (LECTURE START, AB TERMINAL TOKYO OFFICE JAPAN, CA TERMINAL NEW YORK OFFICE USA, CB TERMINAL NEW YORK OFFICE USA) corresponding to the terminal IDs (01ab, 01ba, . . . , 01db, . . . ) of the destination terminals (10ab, 10ba, . . . , 10db, . . . ) are extracted.

Next, the transmitter-receiver unit 51 of the management system 50 retrieves data indicated by an address list frame (i.e., data indicated by the address list frame 1100-1 in FIG. 9) from the nonvolatile storage unit 5000 (step S28), and transmits the address list information (address list frame, terminal IDs, address names) including the address list frame, the terminal IDs and the destination names extracted by the terminal extraction unit 54 to the request source terminal (i.e., terminal 10aa) (step S29). Accordingly, in the request source terminal (terminal 10aa), the transmitter-receiver unit 11 receives the address list information and the storing-reading processing unit 19 stores the address list information in the volatile storage unit 1100 (step S30).

In this embodiment, the address list information is not managed by the terminal 10 but is managed by the management system 50. The management system 50 uniformly manages the address list information of all the terminals in the communication system 1. Thus, even if a new terminal 10 is added to the communication system 1, a new model terminal 10 is replaced with the terminal 10 in the communication system 1, or the appearance of the address list frame is altered, the management system 50 side may handle all the processes concerning these alternations at once so that the terminal 10 side may not need to carry out the process of changing the address list information.

The terminal management unit 53 of the management system 50 searches the terminal management table (see FIG. 6(B)) by the terminal ID (01ab, 01ca, 01cb) of the terminals serving as the destination candidate terminals extracted by the terminal extraction unit 54. The terminal management unit 53 reads the operating status, the communication status, the presenter information and the restriction information of each of the terminal IDs extracted by the terminal extraction unit 54 so that the terminal management unit 53 can retrieve the operating status, the communication status, the presenter information and the restriction information of the terminal (10ab, 10ca, 10cb) serving as the destination candidate terminals (Step S31).

Next, the transmitter-receiver unit 51 of the management system 50 transmits a terminal status information including the terminal ID (01ab) of the terminal (10ab) serving as the destination candidate terminal, the operating status, the communication status, the presenter information and the restriction information of the terminal (10ab), to the terminal 10aa via the communication network (Step S32). And the transmitter-receiver unit 51 transmits a terminal status information including the terminal ID (01ca, 01cb) of the terminal (10ca, 10cb) serving as the destination candidate terminal, the operating status, the communication status, the presenter information and the restriction information of the terminal (10ca, 10cb), to the terminal 10aa.

Next, the storing-reading processing unit 19 stores the terminal status information received from the management system 50 in the volatile storage unit 1100 (Step S33). Accordingly, the terminal 10aa can retrieve the operating status of the terminal (10ab, 10ca, 10cb) serving as the destination candidate terminals that are able to communicate with the terminal 10aa.

Next, the address list creating unit 20 of the terminal 10aa creates an address list reflected the status of the terminal 10 serving as the destination candidate terminal based on the address list information and the status information stored in the volatile storage unit 1100. And the display control unit 16 controls a displaying the created address on the display 120aa.

Figure 9:
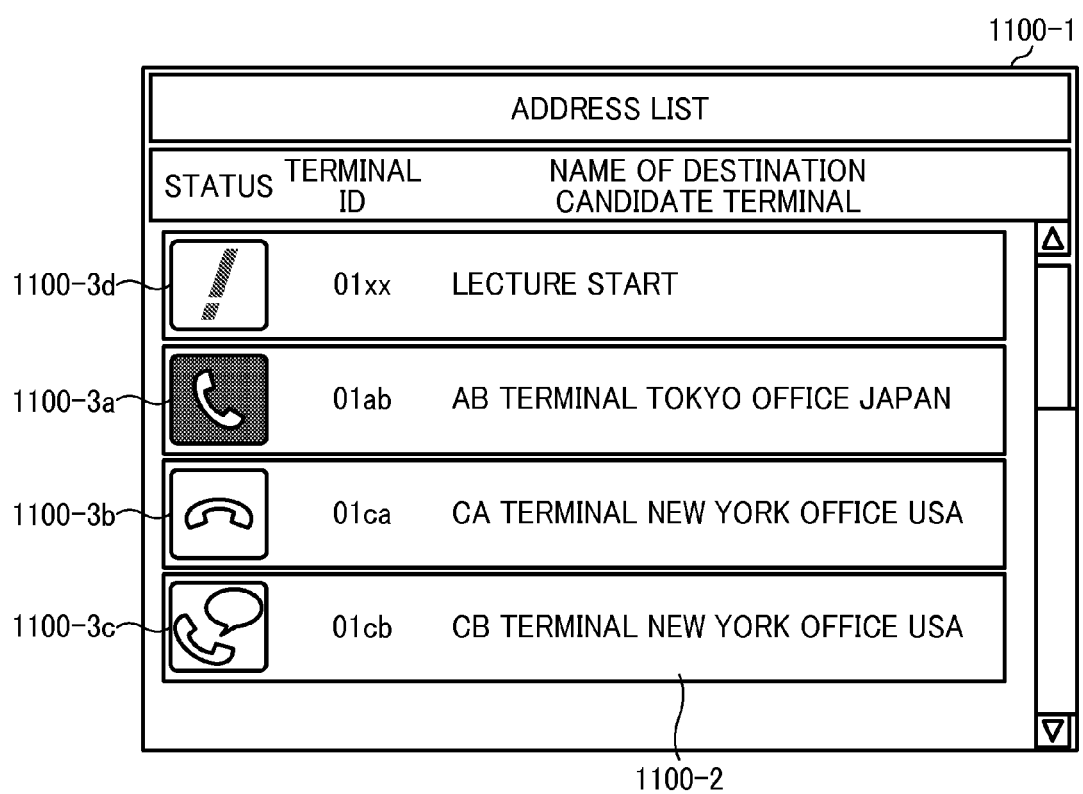
FIG. 9 is a conceptual diagram illustrating an address list according to an embodiment.

As shown in FIG. 9, the address list indicating a name of the destination candidate terminal 1100-2 and an icon reflected the status information 1100-3 in the address list frame 1100-1 is displayed on the display 120aa. FIG. 9 is a conceptual diagram illustrating an address list according to an embodiment. The address list frame 1100-1 indicates the names of the destination candidate terminals 1100-2 and the icons (1100-3a, 1100-3b, 1100-3c, 1100-3d) reflecting the status information associated with the names of the destination candidate terminals 1100-2. The icon 1100-3a indicates COMMUNICATION OK to the terminal 10ab because a status of the terminal 10ab is ONLINE and WAITING FOR COMMUNICATION (the communication status is NONE). The icon 1100-3b indicates COMMUNICATION NG to the terminal 10ca because a status of the terminal 10ca is OFFLINE. The icon 1100-3c indicates that the terminal 10ca is communicating with the other terminal (the communication status is Busy). Note that the terminal identified with the terminal ID (01xx) is a special terminal such as the terminal that has this address list and the icon 1100-3d associated with the terminal ID (01xx) is different from the icon 1100-3a, the icon 1100-3b and the icon 1100-3c.

[Start Request]

Figure 10:
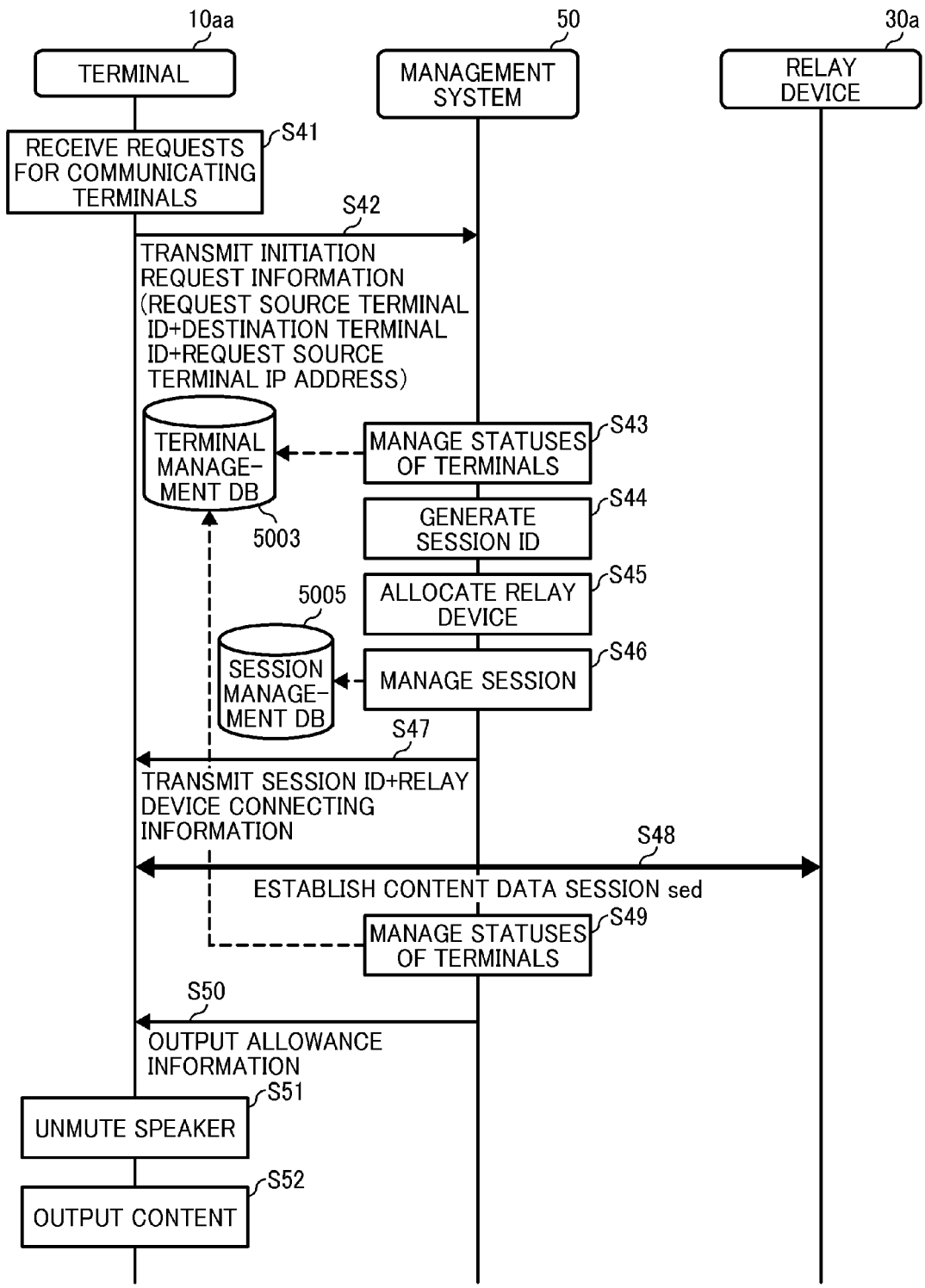
FIG. 10 is a sequence diagram illustrating a process of communication start at the terminal serving as a delivery source of content data.

Next, a process for the terminal 10aa to request for delivery of content data will be described using FIG. 10. FIG. 10 is a sequence diagram illustrating a process of communication start at the terminal 10aa. In the process illustrated FIG. 10, various type of information are transmitted/received in a management information session sei without the process of step S48.

First, when the user of the terminal 10aa presses the operation keys 108 to select the icon associated with the terminal ID (01xx) of the special terminal in the destination candidate terminals (see FIG. 9) displayed on the display 120aa, the operation input acceptor 12 accepts a request for starting communication with the terminal 10aa as the special terminal (Step S41). In response to this request, the data transmitter/receiver 11 of the terminal 10aa transmits, to the management system 50, initiation request information that includes the terminal ID (01aa) of the terminal 10aa serving as a request source terminal, the IP address "1.2.1.3" and the terminal ID (01aa) of the terminal 10aa serving as the destination terminal, the initiation request information that indicates request for starting communication with the content data session sed.

When the terminal 10 serving as the request source terminal chooses the terminal serving as the special terminal and the destination terminal, the terminal 10 serving as the request source terminal requests for initiation of delivery of the content data. Accordingly, the terminal management unit 53 changes to the communication status "Presentation Busy" indicating communication in delivery mode is carried out, the communication status "Presentation Busy" is associated with the terminal ID (01aa) of the terminal 10aa serving as the request source terminal, and changes to the presenter information "1" indicating the terminal is the delivery source (presenter), the presenter information "1" is associated with the terminal ID (01aa) of the terminal 10aa serving as the request source terminal.

Next, the session management unit 57 creates a session ID (se1) identifying the content data session sed to carry out the communication requested by the terminal 10aa (Step S44).

Next, the session management unit 57 of the management system 50 chooses the relay device 30 relaying the content data via the content data session sed created based on the terminal 10aa's request (Step S45). In this embodiment, a situation in which the session management unit 57 selects the relay device 30 is illustrated.

The session management unit 57 finishes choosing the relay device 30, the session management unit 57 stores the session ID (se1) associated with the terminal ID (01aa) of the terminal 10aa serving as the participant terminal participating in the content data session sed and the relay device ID (111a) of the relay device 30a chosen by the process of the Step S45 in the session management table (see FIG. 6(D)) included by the nonvolatile storage unit 5000 (Step S46).

Next, the transmitter-receiver unit 51 transmits, the session ID created by the process of the Step S44 and the relay device connection information used in connection with the relay device 30a chosen by the process of the Step 45, to the terminal 10aa via the communication network 2 (Step S47). The IP address "1.2.1.2" of the relay device 30a, a authentication information and a port number and so on may be included in the relay device connection information.

Note that the transmitter-receiver unit 51 may transmit, information indicating the terminal 10aa is the terminal serving as the delivery source of the content data in the lecture mode, to the terminal 10aa serving as the request source terminal.

The transmitter-receiver unit 11 of the terminal 10aa transmits the session ID (se1) based on the relay device connection information to the relay device 30a. Accordingly, the terminal 10aa connects with the relay device 30a and the content data session sed is established between the terminal 10aa and the relay device 30a (Step S48).

When the content data session sed has been established, the terminal management unit 53 changes to OFF in the RESTRICTION INFORMATION field of the record indicating terminal ID (01aa) of the terminal 10aa in the terminal management table (See FIG. 6(B)). In response to the change of the restriction information, the transmitter-receiver unit 51 of the management system 50 transmits output allowance information indicating that an output of content data from the microphone 114 and the speaker 115 is allowed (Step S50).

When the transmitter-receiver unit 11 of the terminal 10aa receives the output allowance information, the microphone 114 starts outputting the image data from the camera 112 and the sound input unit 15a starts outputting the sound data with unmuting the microphone 114 (Step S51). The transmitter-receiver unit 11 of the terminal 10aa transmits the output image data and sound data to the relay device 30a via the content data session sed. The relay device 30a transmits the received image data and sound data to the terminal 10aa participating in this content data session sed. Accordingly, the terminal 10aa receives the image data and sound data sent from the terminal 10aa.

Figure 11:
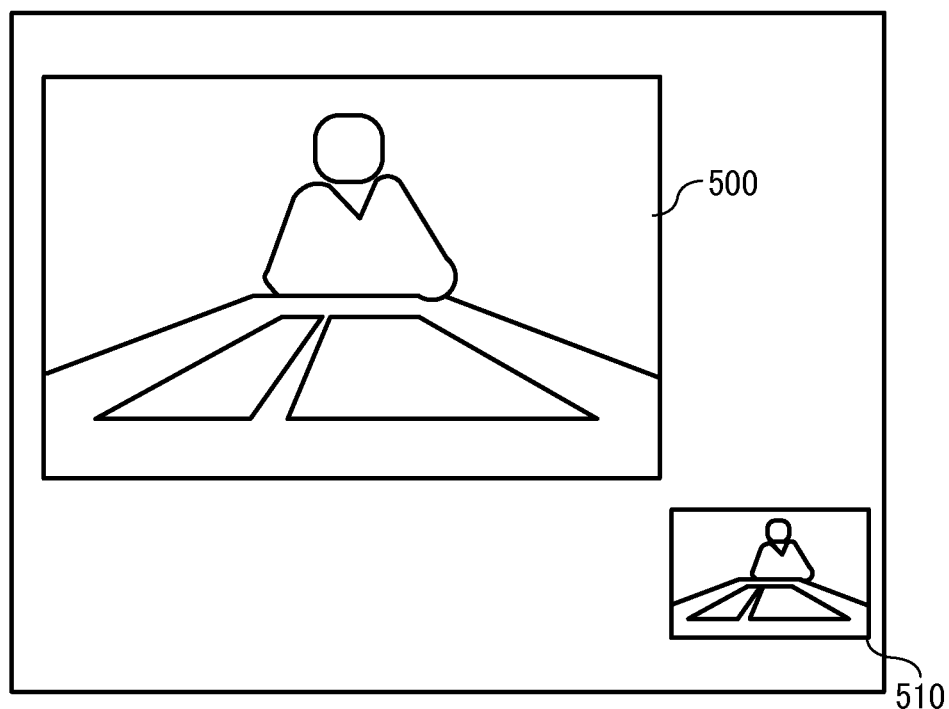
FIG. 11 is an illustration of an example of the image output by the process of the Step S52.

When the transmitter-receiver 11 of the terminal 10*aa* receives the image data and the sound data, the image is output from the display 120*aa* based on the received image data by the display control unit 16 and the sound is output from the speaker 115 based on the received sound data by the sound output unit 15*b* (Step S52). FIG. 11 is an illustration of an example of the image output by the process of the Step S52. As shown by the FIG. 11, an image 500 captured by the imaging unit 14 of the terminal 10*aa* and an image 510 based on the image data received by the transmitter-receiver 51 are displayed on the display 120*aa*. Accordingly, it is possible for an user of the terminal 10*aa* to check whether the camera 112 operates or not or whether the image data transmitted from the terminal 10*aa* is delivered or not.

[Participation]

Figure 12:
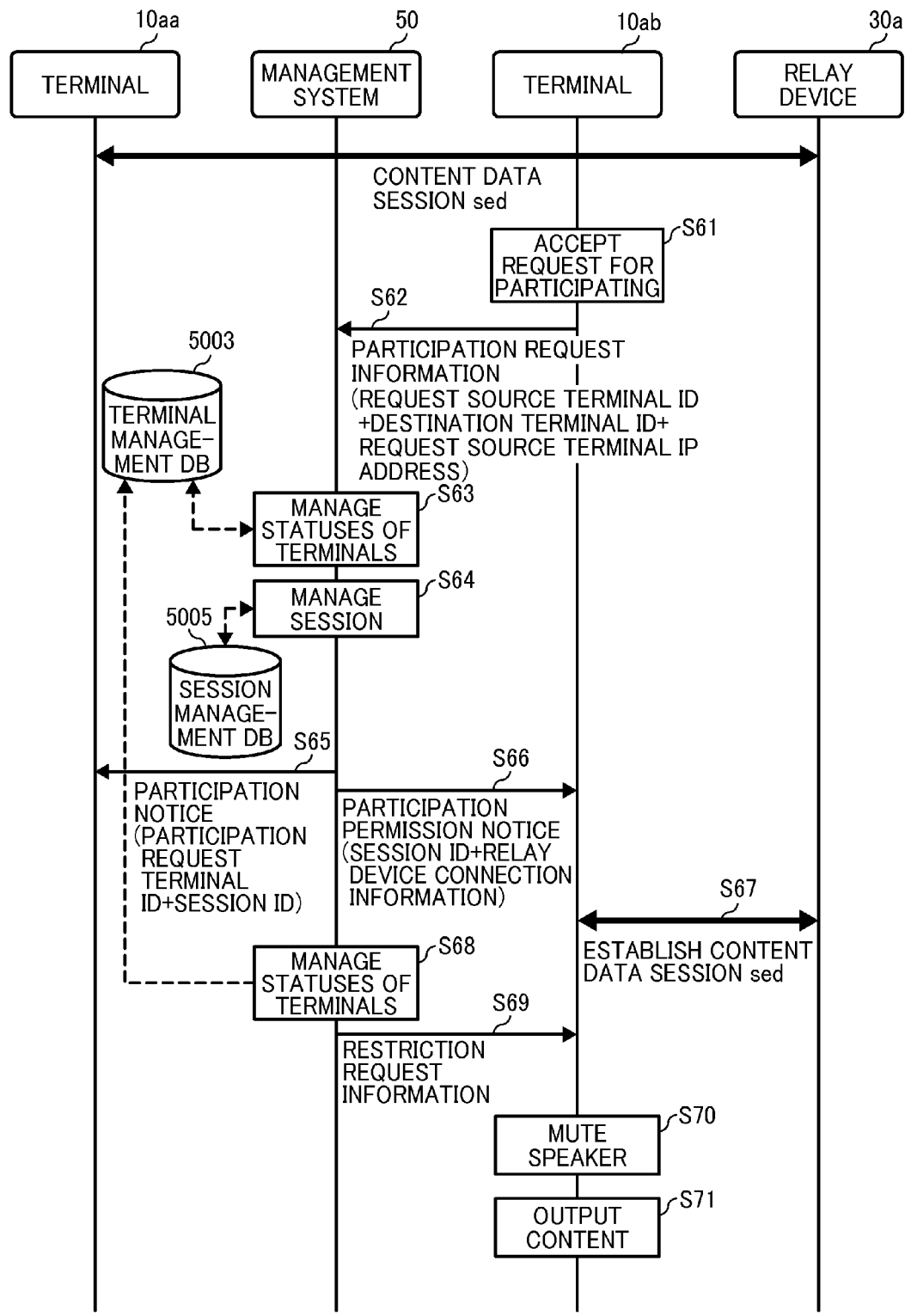
FIG. 12 is a sequence diagram illustrating a process of a participation in the content data session.

Next, a process, after the content data session sed is established by the terminal 10*aa*, for the terminal 10*ab* to participate in this content data session sed and to receive the delivery of the content data from the terminal 10*aa* will be described using FIG. 12. FIG. 12 is a sequence diagram illustrating a process of a participation in the content data session sed. In the process illustrated FIG. 12, various type of information are transmitted/received in a management information session sei without the process of step S67.

Figures 13, 14:
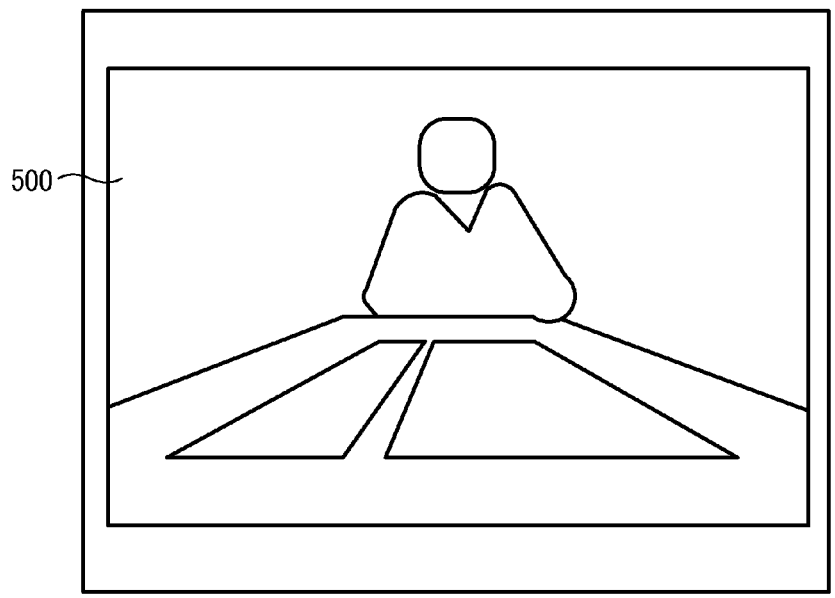
FIG. 13 is a conceptual diagram illustrating an address list according to an embodiment.
FIG. 14 is an illustration of an example of the image output by the process of the Step S71.

The terminal 10*ab* logs in to the management system 50 in the same way of the process from the Step S21 to the Step S34. The display 120*ab* of the display 10*ab* displays the address list as shown by FIG. 13. FIG. 13 is a conceptual diagram illustrating an address list according to an embodiment. Note that when the address list is displayed on the display 10*ab* of the display 120*ab* the terminal 10*aa* starts the content data session sed. And the information indicating the "PRESENTATION BUSY" as the communication status of the terminal 10*aa* and the information indicating the "1" as the presenter information manage in the terminal management table (See FIG. 6(B)) of the management system 50. The display control unit 16 of the terminal 10*ab* causes, based on the status information of the terminal 10*aa* transmitted from the management system 50, a icon 1100-3*e* indicating the status of the terminal 10*aa* and the icon 1100-3*e* indicating the participation in the content data session sed by the terminal 10*aa* serving as the presenter of the lecture, to display on the display 120*ab*.

Next, when the user of the terminal 10*ab* presses the operation keys 108 to select the icon 1103-*e* associated with the terminal ID (01*aa*) of the terminal 10*aa* in the destination candidate terminals (see FIG. 13) displayed on the display 120*ab*, the operation input acceptor 12 accepts a request for starting communication with the terminal 10*aa* serving as the terminal of the presenter participating in the content data session sed (Step S61). In response to this request, the data transmitter/receiver 11 of the terminal 10*ab* transmits, to the management system 50, participation request information that includes the terminal ID (01*ab*) of the terminal 10*ab* serving as the request source terminal, the IP address and the terminal ID (01*aa*) of the terminal 10*aa* serving as the destination terminal, the participation request information that indicates request for participation in the content data session sed (Step S62).

Next, the terminal manager 53 of the management system 50 searches the terminal management DB 5002 (see FIG. 6(B)) by using the terminal ID (01*aa*) of the terminal 10*aa* serving as the destination terminal, which is included in the participation request information, as a search key, and reads the communication status "PRESENTATION BUSY" of the terminal 10*aa* serving as the destination terminal (Step S63).

Note that when the terminal 10 serving as the request source terminal chooses the terminal participating in the content data session sed and having the communication status "PRESENTATION BUSY", it is treated that this terminal 10 requests for receiving the delivery the content data with participating in the content data session sed. Accordingly, the terminal management unit 53 changes, in response to the reading the communication status of the destination terminal, to "PRESENTATION BUSY" in the COMMUNICATION STATUS field of the record indicating the terminal ID (01*ab*) of the terminal 10*ab* serving as the request source terminal in the terminal management table (See FIG. 6(B)).

Next, the session management unit 57 reads the session ID (se1) of the session participating in the terminal 10*aa* serving as the destination terminal in the session management table (see FIG. 6(D)) and additionally stores the terminal ID (01*ab*) of the terminal 10*ab* serving as the request source terminal in the PARTICIPANT TERMINAL field of the record indicating the session ID (se1).

Next, the transmitter-receiver unit 51 of the management system 50 transmits a participation notice including the terminal ID (01*ab*) of the terminal 10*ab* serving as the terminal requesting for participating in the content data session sed and the session ID (se1) to the terminal 10*aa* that has already participated in the content data session. Accordingly, the terminal 10*aa* can get the terminal 10*ab*'s request for participating in the content data session.

Furthermore, the transmitter-receiver unit 51 of the management system 50 transmits, the session ID (se1) of the content data session sed and a participation permission notice including the relay device connection information used in connection with the relay device 30*a*, to the terminal 10*ab* serving as the request source terminal (Step S66). Note that in the process of the Step S66, the transmitter-receiver unit 51 of the management system 50 transmits, information indicating the content data delivery from the terminal 10*aa* serving as the terminal of the presenter in the lecture is initiated, to the terminal 10*ab* serving as the request source terminal.

The transmitter-receiver unit 11 of the terminal 10*ab* transmits the session ID (se1) to the relay device 30*a* using the relay device connection information received from the management system 50. Accordingly, a content data session sed is established between the terminal 10*aa* and the terminal 10*ab* (Step S67).

When the content data session sed is established, the terminal management unit 53 changes to "ON" in the RESTRICTION INFORMATION field of the record indicating the terminal ID (01*ab*) of the terminal 10*ab* in the terminal management table (See FIG. 6(B)) (Step S68). In response to changing the restriction information, the transmitter-receiver 51 of the management system 50 transmits, restriction request information indicating request for restricting output of the content data (the sound data and the image data) from the terminal 10*ab*, to the terminal 10*aa* (Step S69).

When the transmitter-receiver unit 11 of the terminal 10*ab* receives the restriction request information, the imaging unit 14 restricts outputting the image data and the sound output unit 15*b* restricts outputting the sound data (Step S70). The way of the restriction is, for example, the imaging unit 14 or the sound output unit 15*b* stops outputting the content data fully, or the imaging unit 14 or the sound output unit 15*b* outputs the content data of low resolution. Both restricting transmitting the content data from the terminal 10*ab* and transmitting the content data from the terminal 10*aa* is carried out so that the relay device 30*a* can transmit, the content data from the terminal 10aa, to the terminal, that is the terminal 10aa and the terminal 10ab, participating in the content data session. Accordingly, the terminal 10ab can receive the image data and the sound data from the terminal 10aa.

When the transmitter-receiver of the terminal 10ab receives the image data and the sound data, the image is output, based on the received image data, by the display control unit 16 from the display 120ab and the sound is output, based on the received sound data, by the sound output unit 15b from the speaker 115 (Step S71). FIG. 14 is an illustration of an example of the image output by the process of the Step S71. As shown by the FIG. 14, an image 500 based on the image data transmitted from the terminal 10aa are displayed, by the display control unit 16 of the terminal 10ab, on the display 120ab. Accordingly, it is possible for an user of the terminal 10ab to review the image data transmitted from the presenter of the lecture. The process that, after the terminal 10aa and the terminal 10ab have participated in the content data session sed, the other terminal participates in this content data session sed and receives the delivery is as same as the process of from the Step 61 to the Step 71. In this case, it is enough for the other terminal 10 to choose a voluntary terminal 10 serving as the destination terminal participating in the content data session sed. Note that it is enough that the voluntary terminal 10 is a terminal serving as the terminal of the delivery source of the content data or the terminal of the receiver of the content data.

[Second Embodiment]

Figure 15:
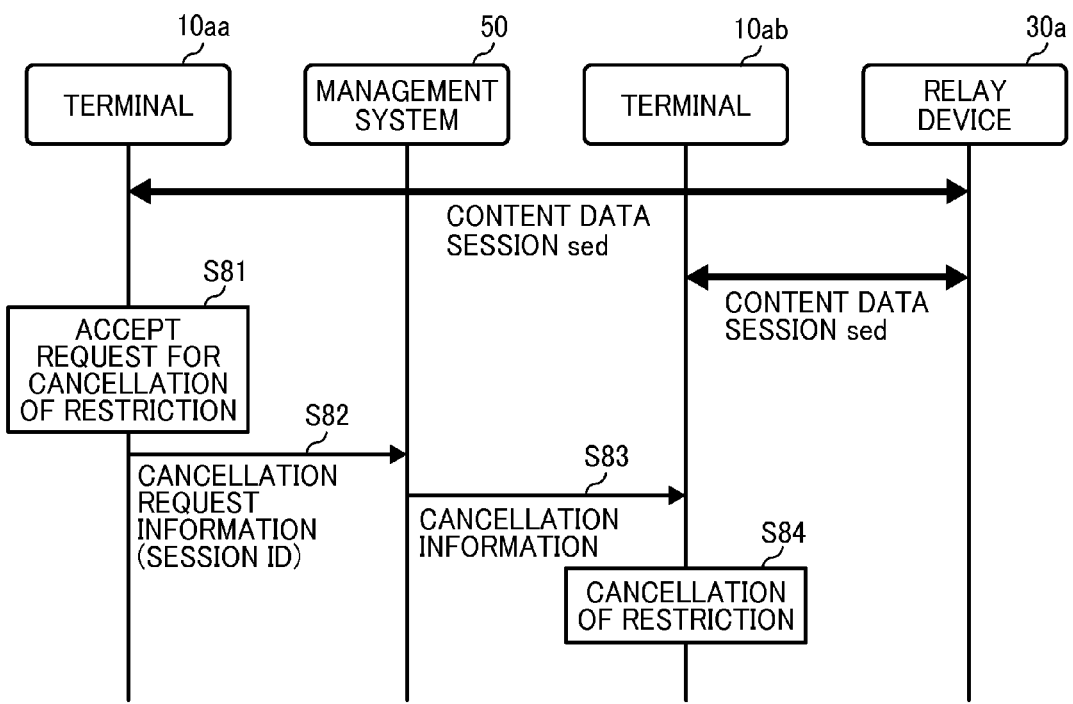
FIG. 15 is a sequence diagram illustrating a process to cancel the restriction of the transmitting the content data.

Next, the points of a second embodiment of the present invention that are different from the first embodiment will be described using FIG. 15. FIG. 15 is a sequence diagram illustrating a process to cancel the restriction of the transmitting the content data. The second embodiment will describe a process of cancelling the restriction of the transmitting the content data, for an user of the terminal 10aa serving as the terminal for the presenter to receive a question from a user serving as a participant, the restriction is set at the terminal 10 serving as the terminal of the receiver of the content data and used by the user serving as the participant.

Figure 16:
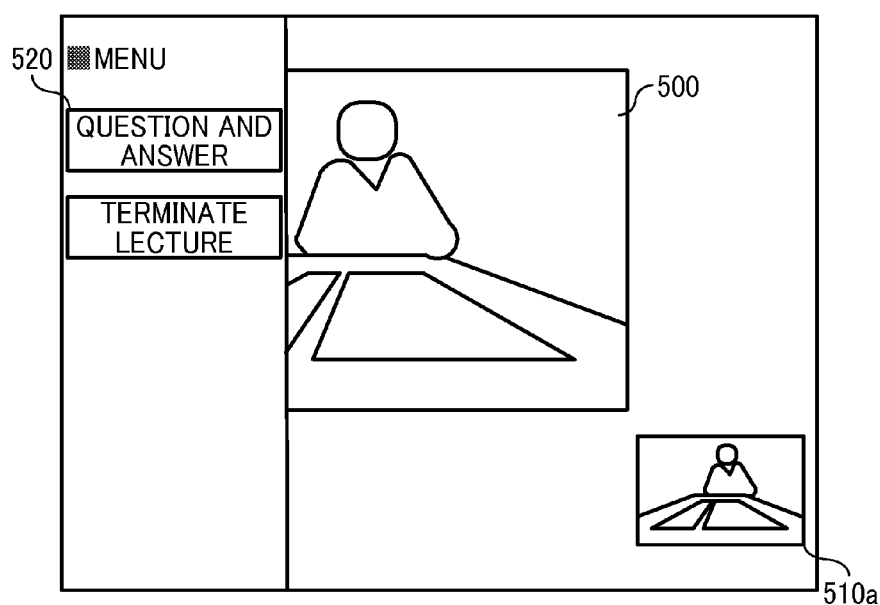
FIG. 16 is an illustration of an example of the image output by the process of the Step S81.

Next, when the user of the terminal 10aa serving as the terminal for the presenter participating in the content data session sed presses the operation keys 108, the operation input acceptor 12 accepts a request for cancelling the restriction of transmitting the content data, the restriction is set at the terminal 10, except for the terminal for the presenter, participating in the content data session (Step S81). The way of acceptance of this request is, for example, that the display controller unit 16 causes a button 520 for a request accepting illustrating FIG. 16 to display and the operation input acceptor 12 detects the pressing the button 520. FIG. 16 is an illustration of an example of the image output by the process of the Step S81.

In acceptance to this request, the data transmitter/receiver 11 of the terminal 10aa transmits, to the management system 50, a cancellation request information that indicates request for cancelling the restriction of transmitting the content data (Step S82). The cancellation request information include the session ID (se1) of the content data session sed participating in the terminal 10aa.

When the transmitter-receiver 51 of the management system 50 receives the cancellation request information, the session management unit 57 of the management system 50 specifies the terminal 10ab participating in the session identifying the session ID (se1) in referring the session management table (See FIG. 6(D)) (Step S83). And, in the process of Step S83, the transmitter-receiver 51 of the management system 50 transmits, the cancellation information for cancelling the restriction of transmitting the content data, to the terminal 10ab.

When the transmitter-receiver 11 of the terminal 10ab receives the cancellation information, the imaging unit 14 cancels the restriction of outputting the image data from the camera 112 during predetermined time and the sound input unit 15a temporally cancels the restriction of outputting the sound data from the microphone 114 (Step S84). Accordingly, it is possible for the terminal 10ab to temporally transmit the content data to the relay device 30a. And the relay device 30a transmits, the content data transmitted from the terminal 10ab, to the terminal (for example the terminal 10aa) participating in the contend data session sed. Accordingly, it is possible for the user of the terminal 10aa to accept the question.

Figure 17:
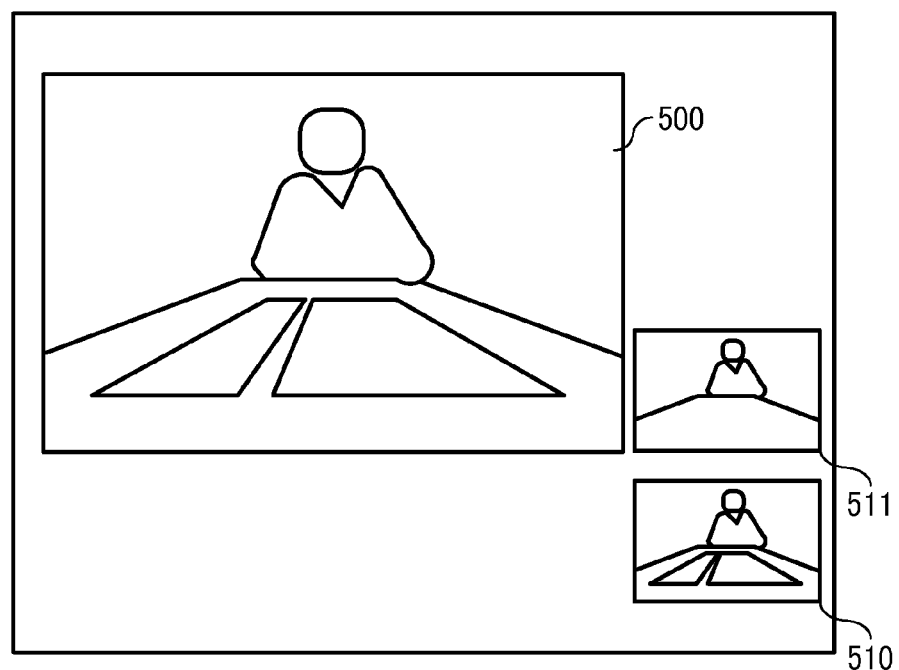
FIG. 17 is an illustration of an example of the image output displaying the display.

FIG. 17 is an illustration of an example of the image output displaying the display 120aa of the terminal 10aa when the cancelling the restriction, set at the terminal 10ab, of outputting the content data is carried out. Note that the display control unit 16 of the terminal 10aa can cause an image 511 based on the image data transmitted from the terminal 10ab to display on the display 120aa of the terminal 10aa. Accordingly it is possible for the user of the terminal 10aa to acknowledge a person providing the question, that is, the user of the terminal 10ab.

[Third Embodiment]

Figure 18:
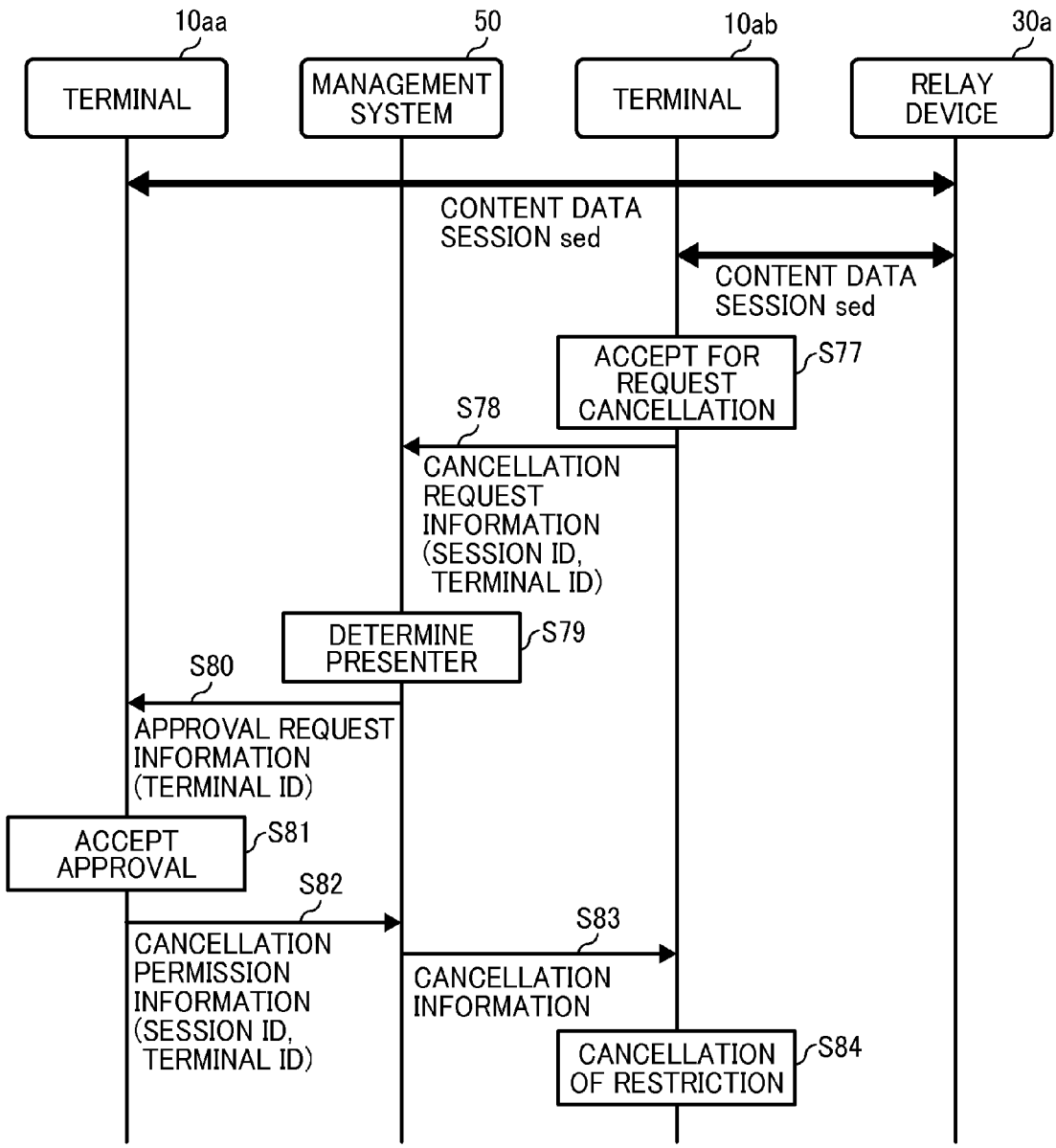
FIG. 18 is a sequence diagram illustrating a process to cancel the restriction of the transmitting the content data

Next, the points of a third embodiment of the present invention that are different from the first and second embodiment will be described using FIG. 18. FIG. 18 is a sequence diagram illustrating a process to cancel the restriction of the transmitting the content data. The third embodiment will describe a process of cancelling the restriction of the transmitting the content data, for an user serving as the participant of the terminal 10ab to provide a question, the restriction is set at the terminal 10 serving as the terminal of the receiver of the content data.

When the user serving as the participant of the terminal 10ab participating in the content data session sed presses the operation keys 108, the operation input acceptor 12 of the terminal 10ab accepts a request for cancelling the restriction of transmitting the content data from the terminal 10ab (Step S77). The way of acceptance of this request is, for example, that the display controller unit 16 causes a button for accepting a request for providing question to display and the operation input acceptor 12 detects the pressing the button 520.

In acceptance to this request, the data transmitter/receiver 11 of the terminal 10ab transmits, to the management system 50, a cancellation request information that indicates request for cancelling the restriction of transmitting the content data (Step S78). The cancellation request information include the session ID (se1) of the content data session sed participating in the terminal 10aa and the terminal ID (01ab) of the terminal 10ab.

The session management unit 57 of the management system 50 searches the session management table (see FIG. 6(D)) by using the session ID (se1) included in the cancellation request information as a search key, and reads the terminal ID of the terminal participating in the content data session identified the session ID (se1) (Step S79). And, in the process of Step S79, the terminal management unit 53 of the management system 50 specifies, by using the read terminal ID, the participant terminal (the terminal 10aa) having the information indicating the "1" as the presenter information manage in the terminal management table (See FIG. 6(B)) of the management system 50.

Next, the terminal management unit 53 searches the terminal management table (see FIG. 6(B)) by using the terminal ID (01ab) serving as the request source terminal, included in the cancellation request information as a search key and reads the terminal name "AB TERMINAL TOKYO OFFICE JAPAN" associated with the terminal ID (01ab) (Step S80). And, in the process of Step S80, the transmitter-receiver 51 of the management system 50 transmits approval request information to the terminal 10aa specified as the presenter, the approval request information is request for approval for canceling the restriction of transmitting the content data of the terminal 10ab and the approval request information includes the terminal ID and the terminal name of the terminal 10ab.

Figure 19:
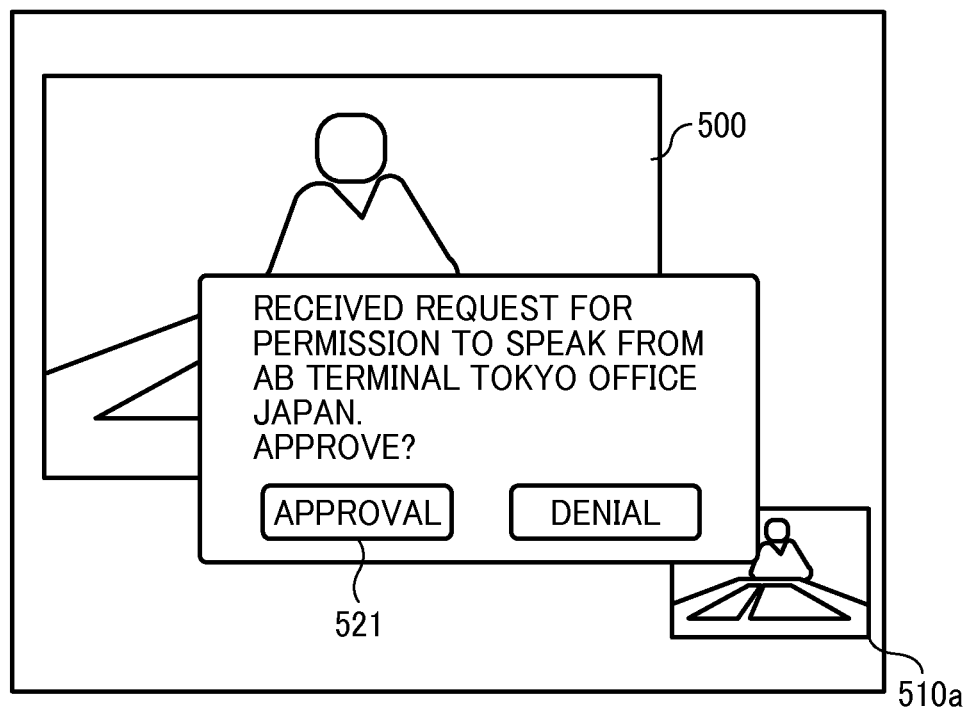
FIG. 19 is an illustration of an example of the image output by the process of the Step S81.

After the terminal 10aa receives the approval request information, the operation input acceptor 12 of the terminal 10aa, based on the operation of the operation keys 108, accepts the approval for cancelling the restriction of transmitting the content data, the restriction set at the terminal 10ab (Step S81). The way of approval of this request is, for example, that the display controller unit 16 causes a button 521 for accepting an approval of cancelling to display and the operation input acceptor 12 detects the pressing the button 521. FIG. 19 is an illustration of an example of the image output by the process of the Step S81. When the operation input acceptor 12 accepts the approval for cancelling the restriction, the transmitter-receiver unit 51 of the terminal 10aa transmits, cancellation permission information indicating permission for canceling the restriction of outputting the content data at the terminal 10ab, to the management system 50 (Step S82). This cancellation permission information includes the terminal ID (01ab) of the terminal 10ab serving as the request source terminal. The process of canceling the restriction at the terminal 10ab is as same as the process illustrated in the second embodiment (Step S83, S84).

In this embodiment, the address list frame 1100-1 including the destination names 1100-2, icons 1100-3a and the like is displayed as illustrated in FIG. 9; however, the destination names 1100-2, icons 1100-3a and the like may be displayed without the address list frame 1100-1.

Further, according to the embodiment, the management system 50 and the program providing system 90 may be integrated in a single computer, or various functions and units of the management system 50 and the program providing system 90 may be separately arranged in two or more computers. Moreover, if the program providing system 90 is formed in a single computer, programs transmitted via the program providing system 90 may be grouped into two or modules or may not be grouped. Further, if the program providing system 90 is formed of two or more computers, the programs grouped into modules may be transmitted from the separate computers.

Moreover, according to the embodiment, recording media storing a terminal program, a relay device program and a communication management program, and the program providing system 90 including the HD 204 storing such programs may be distributed to users domestically and abroad as a program product.

Moreover, according to the embodiment, the IP addresses of the terminals are managed by the terminal management table as illustrated in FIG. 6(B). However, alternatively, respective fully qualified domain names (FQDNs) of the terminals 10 may be managed instead of the respective IP addresses. In this case, a known domain name system (DNS) server may acquire the IP address corresponding to the FQDN.

In this embodiment, the terms "videoconference" and "teleconference" may be interchangeably used.

Further, according to the above embodiment, the video conference system is described as an example of the communication system 1; however, the communication system 1 may not be limited to the video conference system. The communication system 1 may be a telephone system such as an Internet protocol (IP) phone or an Internet phone. Further, the communication system 1 may be a car navigation system. In this case, one of the terminals 10 may be a car navigation device mounted on a vehicle and the other terminal 10 may be a management terminal or a management server configured to manage the car navigation, or another car navigation device mounted on another vehicle. Further, the communication system 1 may be a sound conferencing system or a personal computer (PC) screen shared system.

In addition, the communication system 1 may be a mobile phone communication system. In this case, the terminal 10 may be a mobile phone terminal. FIG. 20 illustrates an example of an address list displayed on the mobile phone terminal. Specifically, the mobile phone terminal as the terminal 10 includes a main body 10-1, a menu screen display button 10-2 arranged on the main body 10-1, a display unit 10-3 arranged on the main body 10-1, a microphone provided in a lower part of the main body 10-1 and a speaker provided in a surface of the main body 10-1. Among these, the "menu screen display button" 10-2 is utilized for displaying a menu screen on which icons of various applications are displayed. The display unit 10-3 is formed of a touch panel on which the user touches with a finger or hand to select a desired address name to communicate with a person of the desired address name.

Further, according to the above embodiment, the image data and the sound data are described as an example of the content data; however, the content data may not be limited to the image data or the sound data. The content data may be touch data (tactile data). In this case, a tactile sense obtained by the user who has touched one terminal may be transmitted to the other terminal. Further, the content data may be smell (olfactory sense) data. In this case, the smell (odor) obtained by one terminal may be transmitted to the other terminal. Further, the content data may be at least one of the image data, the sound data, the touch data and the smell data.

Moreover, according to the above embodiment, the video conference system implemented by the communication system 1 is described; however, the communication system 1 may not be limited to the video conference system. The communication system 1 may be utilized for a preliminary meeting, a general conversation between family members or friends, or one-way presentation of information.

As described above, in the transmission system according to the embodiment, a transmission management system manages a communication status of a first transmission terminal that communicates with a second transmission terminal. When the transmission management system receives alteration information for altering the communication status of the first transmission terminal from the first transmission terminal, the transmission management system alters the communication status of the first transmission terminal based on the received alteration information and the communication status of the first transmission terminal managed by the transmission management system. Accordingly, since the transmission management system detects the communication status of the first transmission terminal, the transmission management system may effectively control connection between the first and second transmission terminal.

The advantages illustrated above are merely examples of the most preferred ones provided by the embodiments, and therefore are not limited to those described in the embodiments.

Embodiments of the present invention have been described heretofore for the purpose of illustration. The present invention is not limited to these embodiments, but various variations and alterations may be made without departing from the scope of the present invention. The present invention should not be interpreted as being limited to the embodiments that are described in the specification and illustrated in the drawings.

The relay devices 30, the management system 50, and the program providing system 90 in the above-described embodiments may be configured by a single computer or a plurality of computers to which divided portions (functions) are arbitrarily allocated.

In addition, in the case where the program providing system 90 is configured by a single computer, a program transmitted by the program providing system 90 may be separately transmitted in units of a plurality of modules, or may be transmitted in its entirety.

Further, in the case where the program providing system 90 is configured by a plurality of computers, a program may be divided into a plurality of modules, and the modules may be individually transmitted from the respective computers.

In addition, a recording medium such as a compact disc read-only memory (CD-ROM) storing a terminal control program, a relay device program, or a communication management program in the above-described embodiments, the HD 204 storing these programs, and the program providing system 90 including the HD 204 are each used in the case where the terminal control program, relay device program, or communication management program is provided as a program product to users within a certain country or outside that country.

Further, although management is performed while paying attention to the resolution of an image of image data relayed by the relay device 30, which serves as an example of the quality of the image of the image data, the embodiments are not limited to this case, and management may be performed while paying attention to other examples of the quality, such as the depth of the quality of image data, the sampling frequency of sound of sound data, or the bit length of sound of sound data. In addition, sound data may be transmitted/received separately in items of data of three types of resolutions (high resolution, intermediate resolution, and low resolution).

Although the IP address of each terminal 10 is managed in FIG. 8, the embodiments are not limited to this case, and any information for identifying each terminal 10 in the communication network 2, such as the fully qualified domain name (FQDN) of each terminal 10, may be managed. In this case, an IP address corresponding to an FQDN is obtained by a Domain Name System (DNS) server.

In addition, although the case of a videoconference system has been described as an example of the communication system 1 in the above-described embodiments, the embodiments are not limited to this case, and the communication system 1 may be a phone system such as an IP phone system or an Internet phone system.

In addition, the communication system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car. In addition, the terminals 10 may be configured by cellular phones in the communication system 1.

In addition, although image data and sound data are described as examples of content data in the above-described embodiments, the content data is not limited to these items of data, and the content data may be touch data. In this case, a feeling obtained by a user's contact at one terminal side is transmitted to the other terminal side.

Further, the content data may be smell data. In this case, a smell at one terminal side is transmitted to the other terminal side. In addition, the content data may be at least one of image data, sound data, touch data, and smell data.

In addition, although the case in which a videoconference is held by the communication system 1 has been described in the above-described embodiments, the embodiments are not limited to this case. The communication system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication management system, comprising:
   a first terminal; and
   a second terminal connected to the first terminal via a network,
   the first terminal and the second terminal each being configured to transmit and receive content data including at least video and audio data captured at a location of each of the first terminal and the second terminal, wherein content data captured at the location of the first terminal is transmitted to the second terminal, and the second terminal is restricted from transmitting content data captured at the location of the second terminal to the network,
   wherein prior to a content data session being established between the first terminal and the second terminal, the first terminal is configured to control display of a list of destination terminals to a user of the first terminal as candidates for communicating with, the list of destination terminals also including an indicator of the first terminal that is displayed in a manner that is distinct from a display of an indicator of other destination terminals in the list, and the first terminal starts communication as a presenter in a presentation when the indicator of the first terminal is selected at the first terminal which causes the first terminal to transmit an initiation request to the network to establish the content data session, where the initiation request includes identification information of the first terminal as both a source terminal and a destination terminal and the first terminal outputs content to the content data session prior to the second terminal requesting to join the content data session.

2. The communication management system of claim 1, wherein restriction information restricts at least one of a camera, microphone and speaker connected to the second terminal from generating content data.

3. The communication management system of claim 1, wherein restriction information causes at least a camera connected to the second terminal to output content data at low resolution.

4. The communication management system of claim 1, further comprising a relay device configured to receive the content data captured at the location of the first terminal and transmit the received content data captured at the first terminal to the second terminal and the first terminal.

5. The communication management system of claim 4, wherein the content session includes a first content data session portion established between the first terminal and the relay device and a second content data session portion established between the second terminal and the relay device.

6. The communication management system of claim 5, further comprising a management device that controls establishment of the first content data session portion and the second content data session portion and controls transmission of restriction information to the second terminal.

7. The communication management system of claim 6, wherein the first terminal controls display of the video data of the content data captured at the location of the first terminal, prior to the content data being transmitted to the relay device, on a first display area of a display connected to the first terminal, and controls display of the video data of the content data of the content data captured at the location of the first terminal, that is transmitted back from the relay device on a separate display area of the display.

8. The communication management system of claim 1, wherein the first terminal is configured to receive an input from a user to cancel the restriction at the second terminal and to transmit information indicating a cancellation of restriction information to the second terminal, and when the restriction at the second terminal is cancelled, the second terminal transmits content data, including at least video data and audio data, captured at the location of the second terminal to the first terminal.

9. The communication management system of claim 8, wherein the first terminal controls display of the video data of the content data captured at the location of the first terminal, prior to the content data being transmitted to the relay device, on a first display portion of a display connected to the first terminal, and controls display of the video data of the content data captured at the location of the second terminal on a separate display portion of the display after the restriction has been cancelled.

10. The communication management system of claim 8, further comprising a management device configured to control transmission of the information indicating a cancellation of the restriction information to the second terminal.

11. The communication management system of claim 1, wherein the second terminal is configured to receive an input from a user to cancel the restriction at the second terminal and to transmit information indicating a request for approval of cancellation of restriction information to the first terminal, and when a user of the first terminal approves the cancellation of the restriction at the second terminal, the first terminal transmits information indicating a cancellation of restriction information to the second terminal, and when the restriction at the second terminal is cancelled, the second terminal transmits content data, including at least video data and audio data, captured at the location of the second terminal to the first terminal.

12. A terminal apparatus comprising:
   circuitry configured to
      control transmission of content, including at least video and audio data captured at a location of the terminal apparatus, to a second terminal apparatus that is connected to the terminal apparatus via a network, and
      control reception and display of content, including at least video and audio data captured at a location of the second terminal apparatus,
   wherein when the second terminal apparatus is designated as a content delivery source, the circuitry is configured to restrict transmission of the content data captured at the location of the first terminal apparatus to the network,
   wherein prior to a content data session being established between the terminal apparatus and the second terminal apparatus, the circuitry of the terminal apparatus is configured to control display of a list of destination terminals to a user of the terminal apparatus as candidates for communicating with, the list of destination terminals also including an indicator of the terminal apparatus that is displayed in a manner that is distinct from a display of an indicator of other destination terminals in the list, and the terminal apparatus starts communication as a presenter in a presentation when the indicator of the first terminal is selected at the terminal apparatus which causes the terminal apparatus to transmit an initiation request to the network to establish the content data session, where the initiation request includes identification information of the terminal apparatus as both a source terminal and a destination terminal and the first terminal apparatus outputs content to the content data session prior to the second terminal apparatus requesting to join the content data session.

13. A method, implemented on a communication management system including a first terminal and a second terminal connected to the first terminal via a network, each being configured to transmit and receive content data including at least video and audio data captured at a location of each of the first terminal and the second terminal, the method comprising:

transmitting content data captured at the location of the first terminal to the second terminal; and restricting the second terminal from transmitting content data captured at the location of the second terminal to the network, wherein prior to a content data session being established between the first terminal and the second terminal, the first terminal controls display of a list of destination terminals to a user of the first terminal as candidates for communicating with, the list of destination terminals also including an indicator of the first terminal that is displayed in a manner that is distinct from a display of an indicator of other destination terminals in the list, and the first terminal starts communication as a presenter in a presentation when the indicator of the first terminal is selected at the first terminal which causes the first terminal to transmit an initiation request to the network to establish the content data session, where the initiation request includes identification information of the first terminal as both a source terminal and a destination terminal and the first terminal outputs content to the content data session prior to the second terminal requesting to join the content data session.

* * * * *